Figure 25:
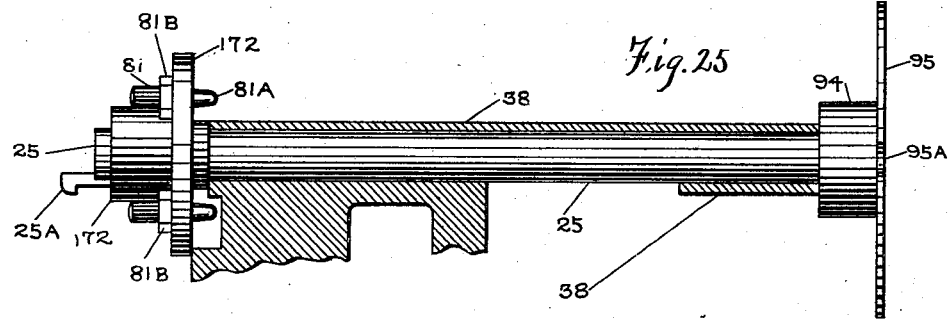

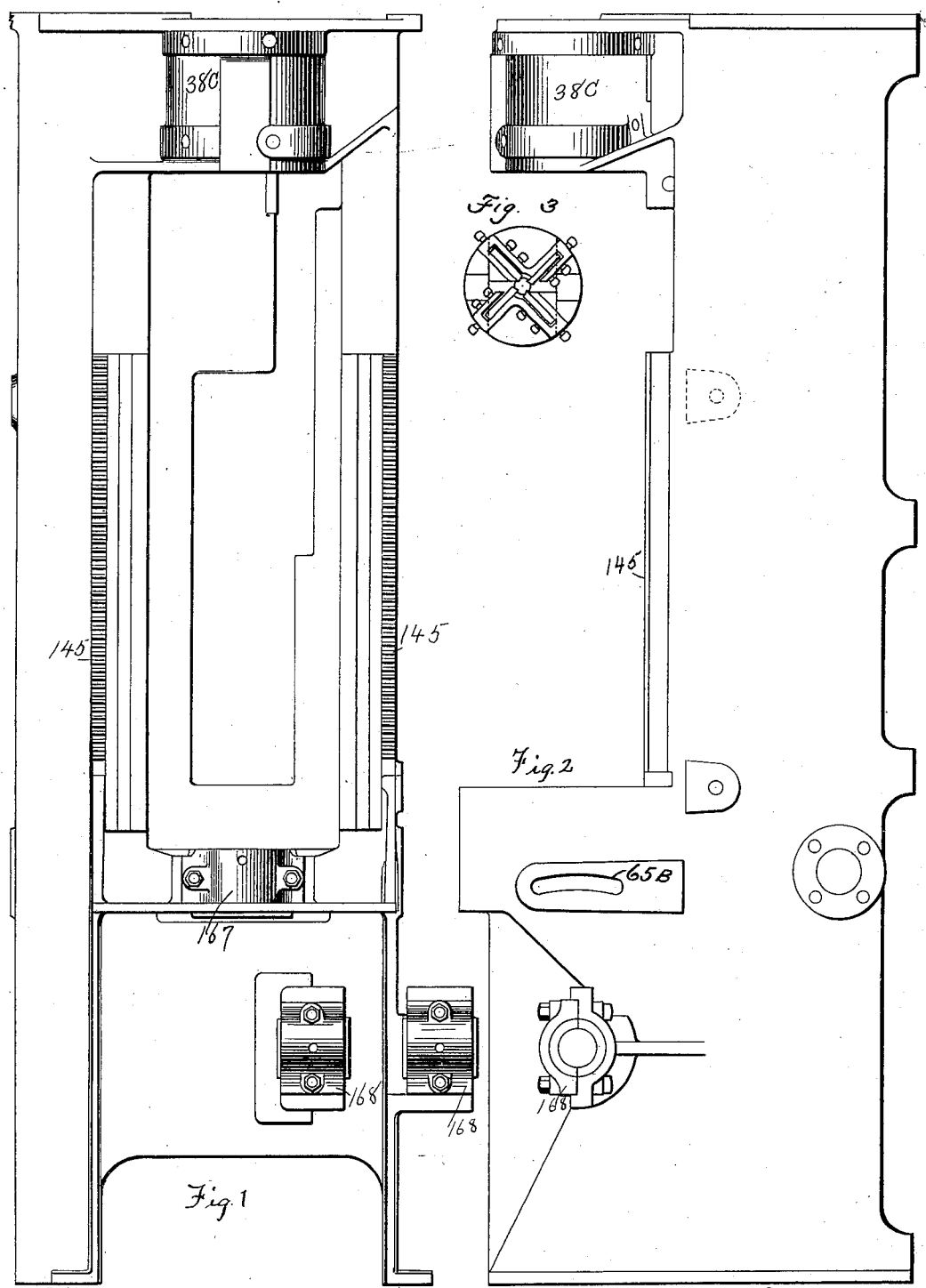

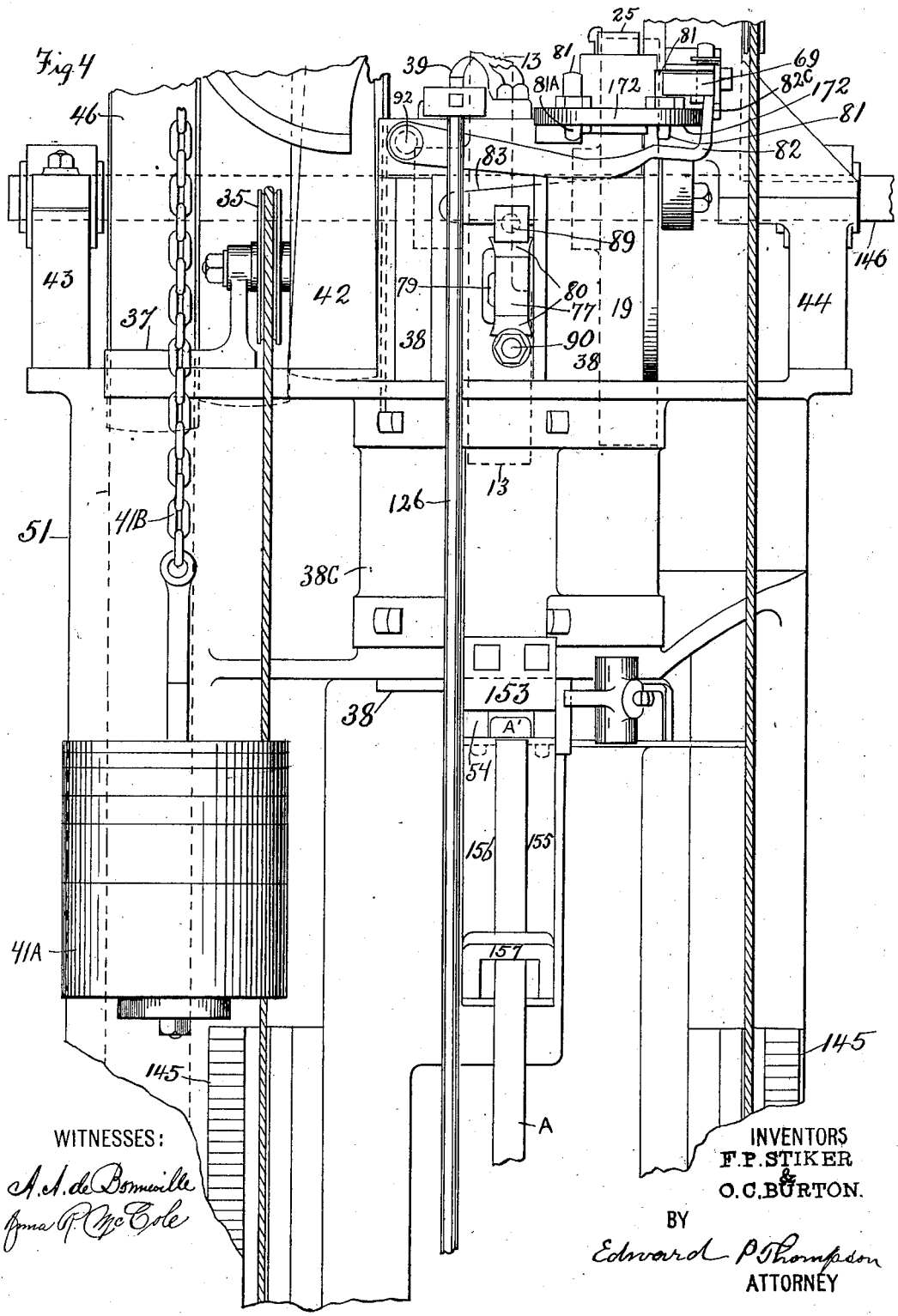

No. 707,272. Patented Aug. 19, 1902.
F. P. STIKER & O. C. BURTON.
METAL DRESSING MACHINE.
(Application filed July 30, 1901.)
(No Model.)
17 Sheets—Sheet 3.
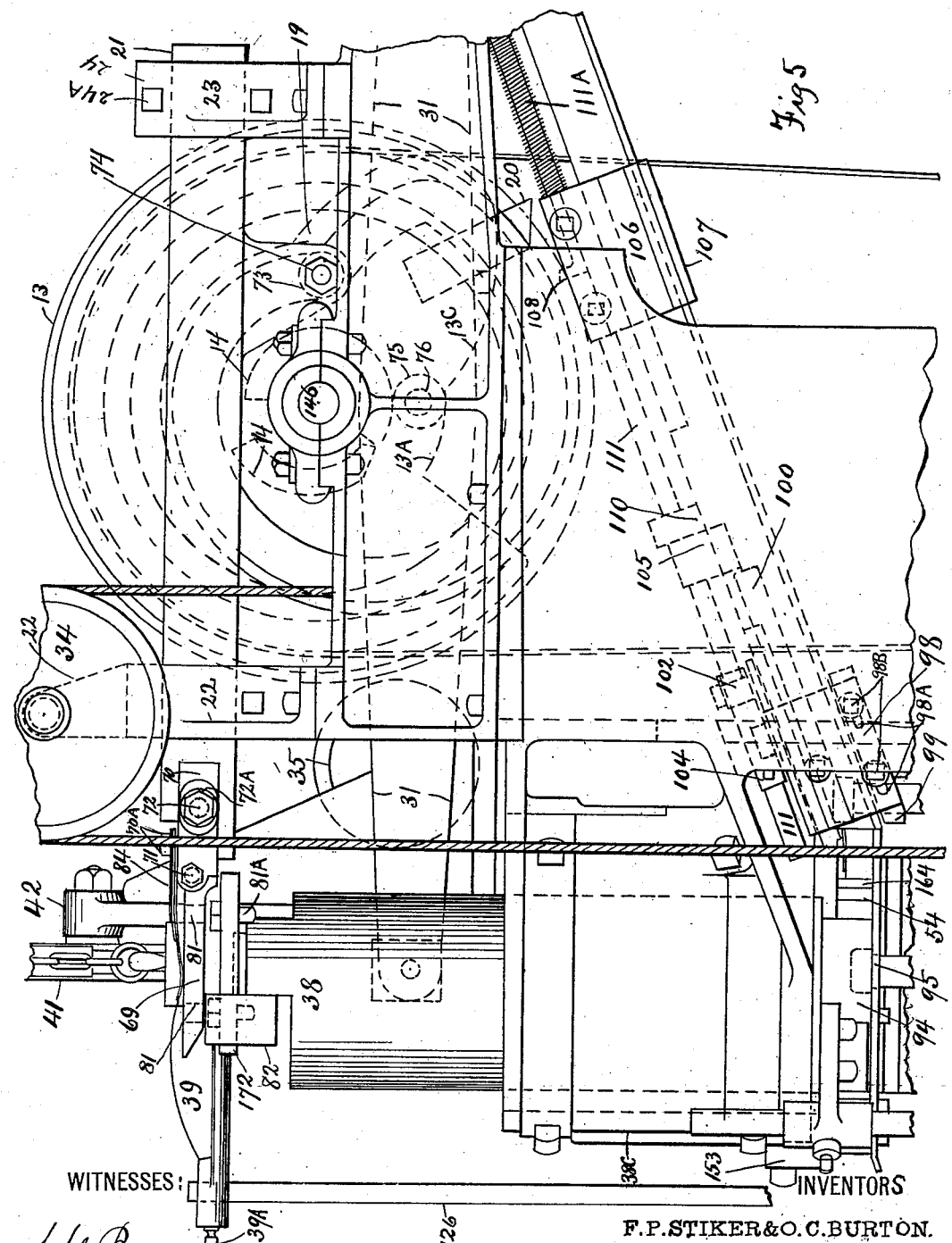
WITNESSES:
AHde Bonneville
Anna P. McCole.
INVENTORS
F. P. STIKER & O. C. BURTON.
BY
Edward P. Thompson
ATTORNEY

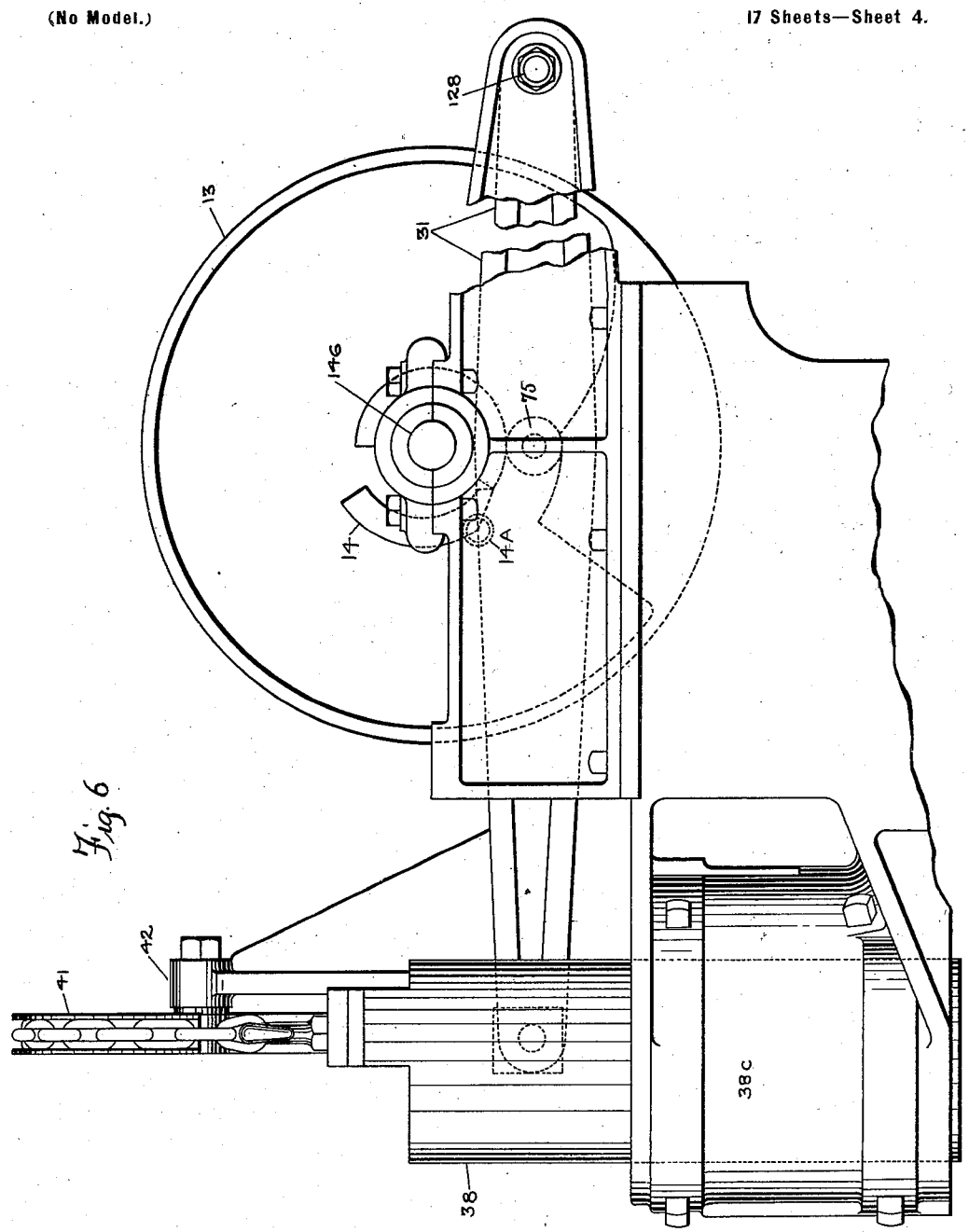

No. 707,272. Patented Aug. 19, 1902.
F. P. STIKER & O. C. BURTON.
METAL DRESSING MACHINE.
(Application filed July 30, 1901.)
(No Model.) 17 Sheets—Sheet 5.
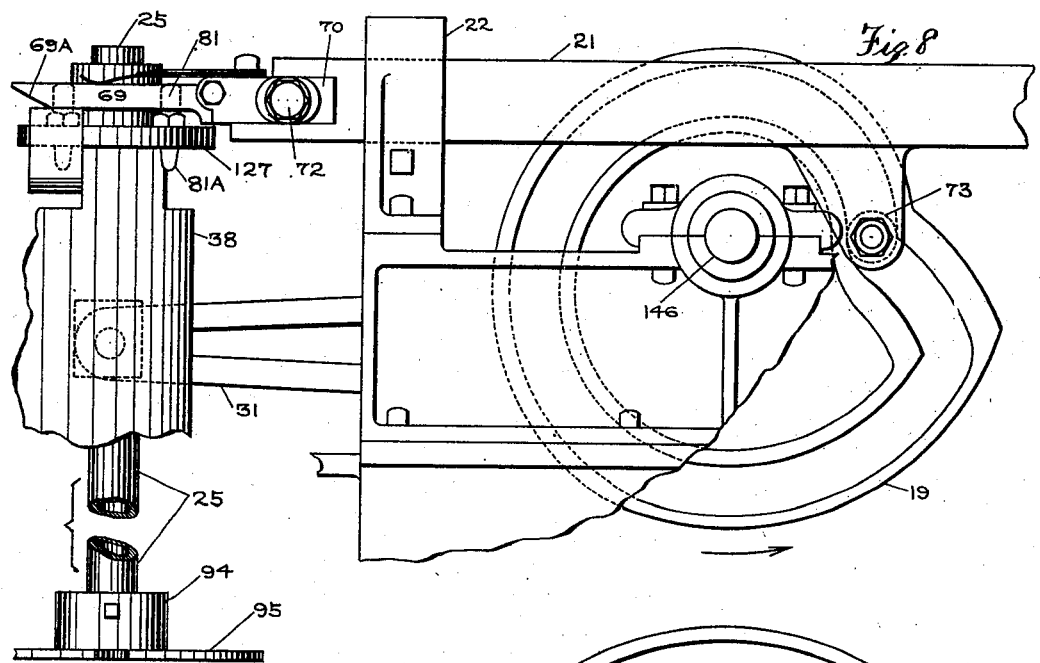
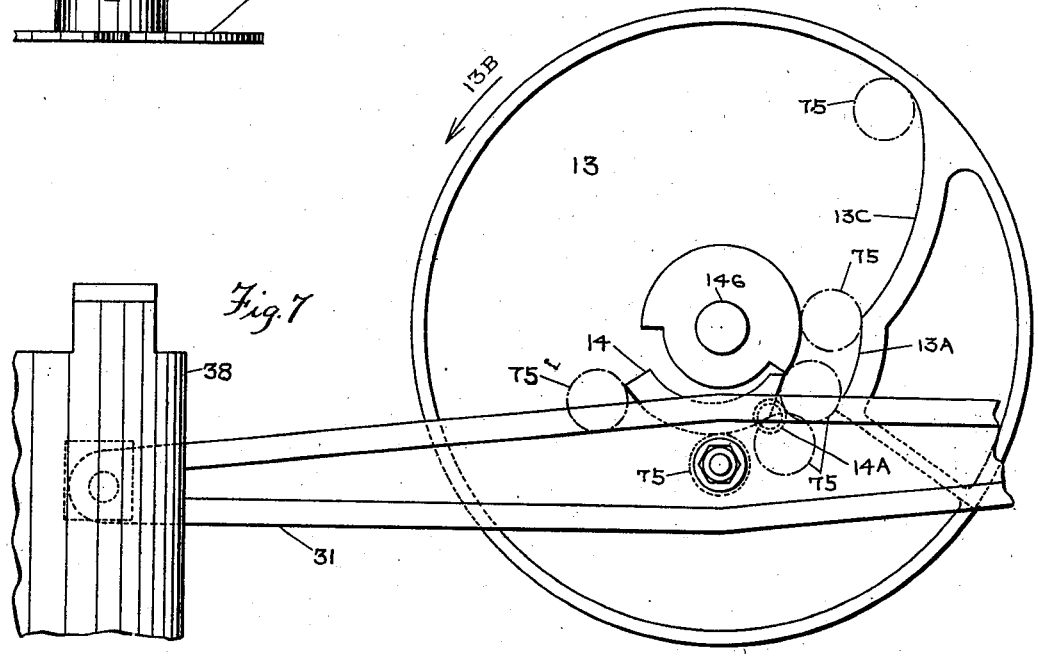
WITNESSES:
INVENTORS
F. P. STIKER & O. C. BURTON.
BY
Edward P. Thompson
ATTORNEY

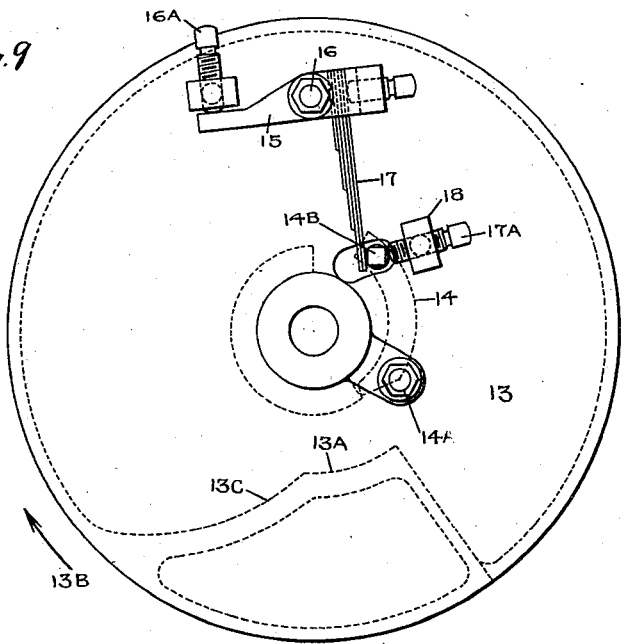

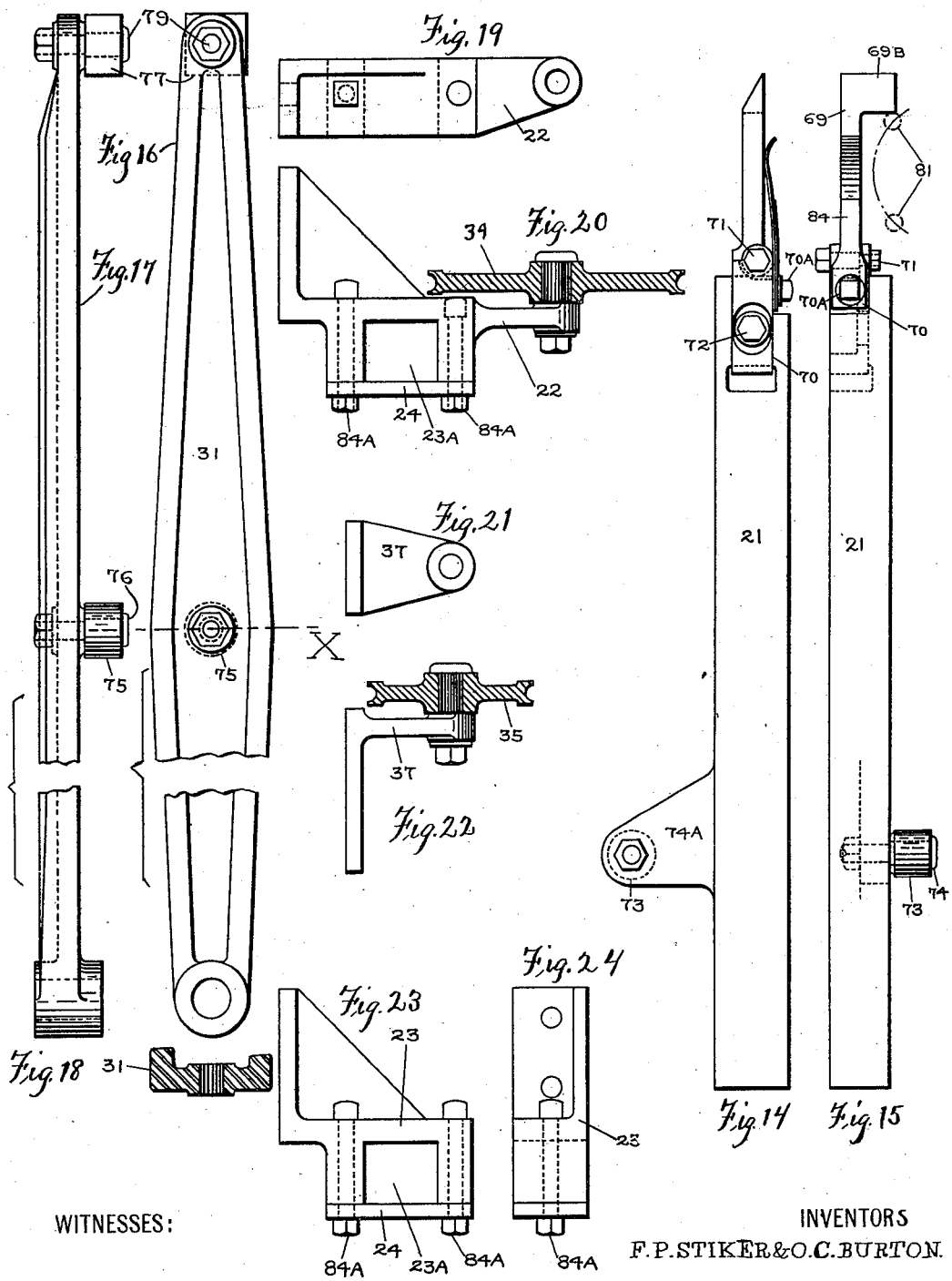

No. 707,272. Patented Aug. 19, 1902.
F. P. STIKER & O. C. BURTON.
METAL DRESSING MACHINE.
(Application filed July 30, 1901.)
(No Model.) 17 Sheets—Sheet 8.

WITNESSES:
Anna P. McCole.
M. L. Smith

INVENTORS
F. P. STIKER & O. C. BURTON.
BY
Edward P. Thompson
ATTORNEY

No. 707,272. Patented Aug. 19, 1902.
F. P. STIKER & O. C. BURTON.
METAL DRESSING MACHINE.
(Application filed July 30, 1901.)
(No Model.) 17 Sheets—Sheet 9.
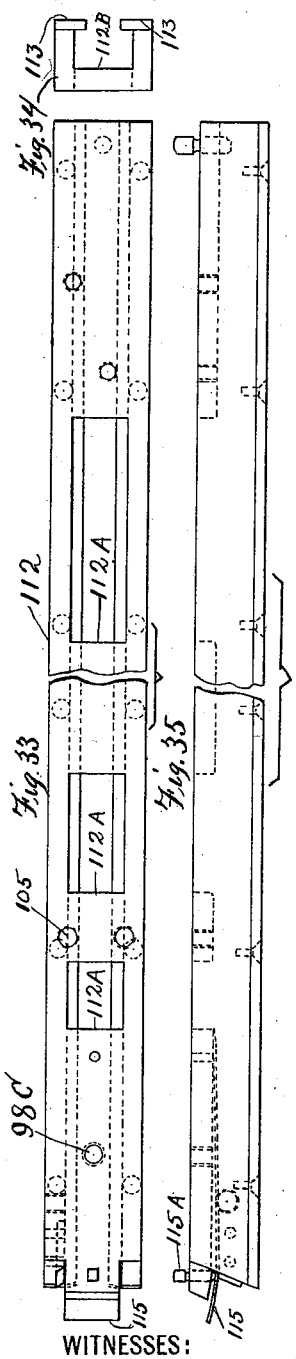
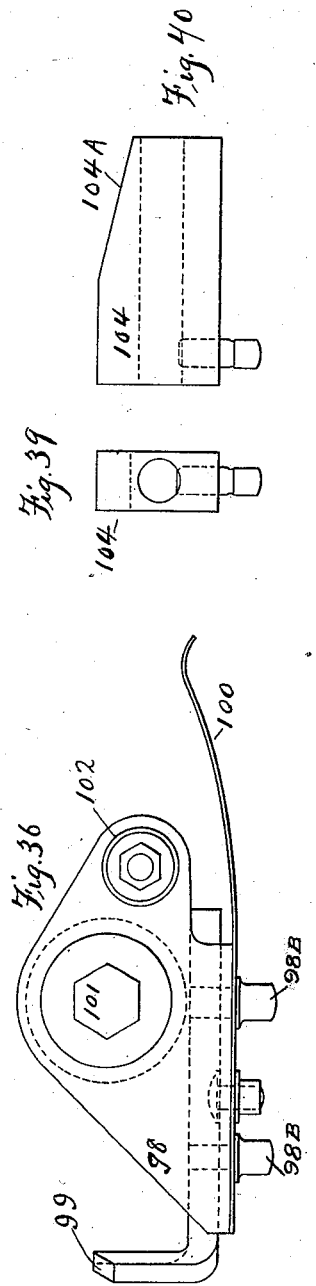
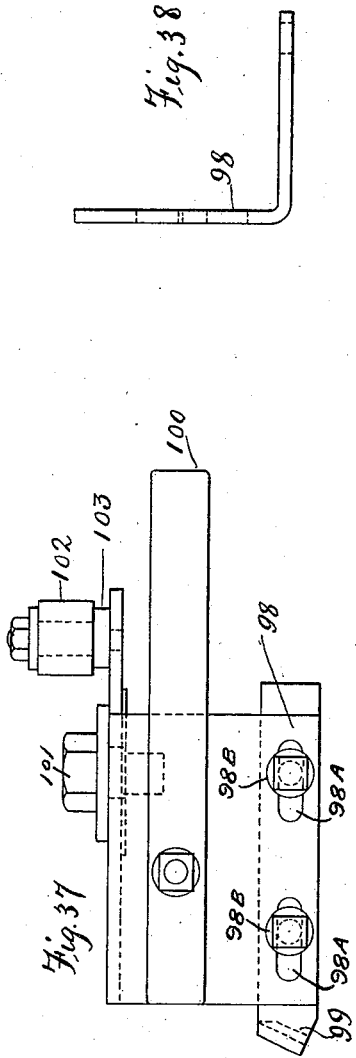
WITNESSES:
Anna P. McCole.
Margaret Barry.
INVENTORS
F. P. Stiker
O. C. Burton
BY
Edward P. Thompson
ATTORNEY No. 707,272. Patented Aug. 19, 1902.
F. P. STIKER & O. C. BURTON.
METAL DRESSING MACHINE.
(Application filed July 30, 1901.)
(No Model.) 17 Sheets—Sheet 10.
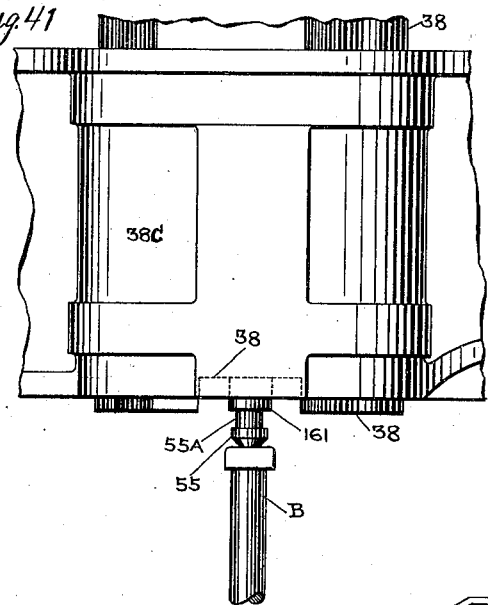
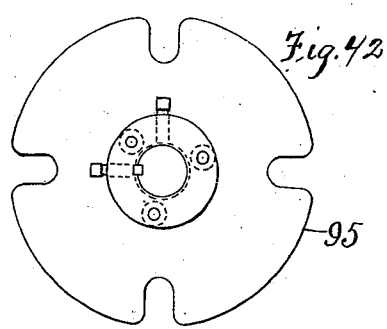
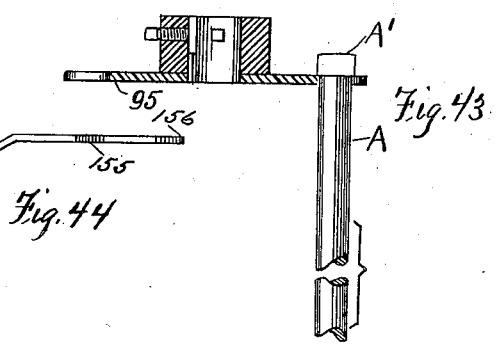
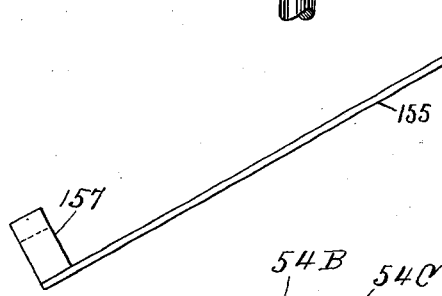
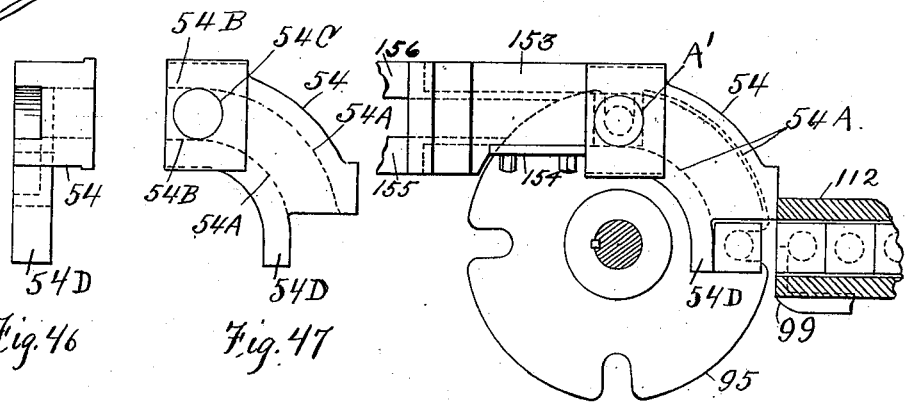
WITNESSES:
A. de Bonneville
Anna P. McCole.
INVENTORS
F. P. STIKER & O. C. BURTON
BY
Edward P. Thompson
ATTORNEY

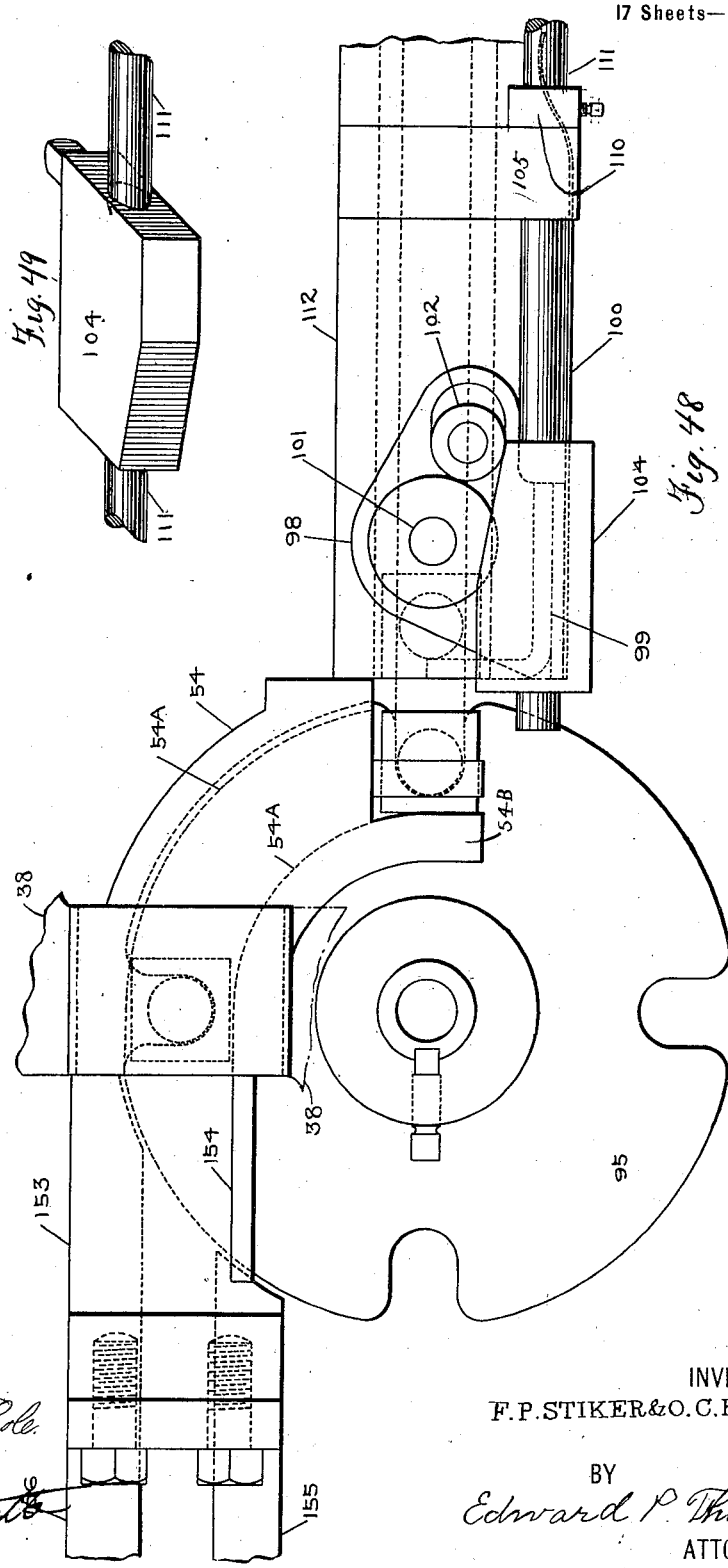

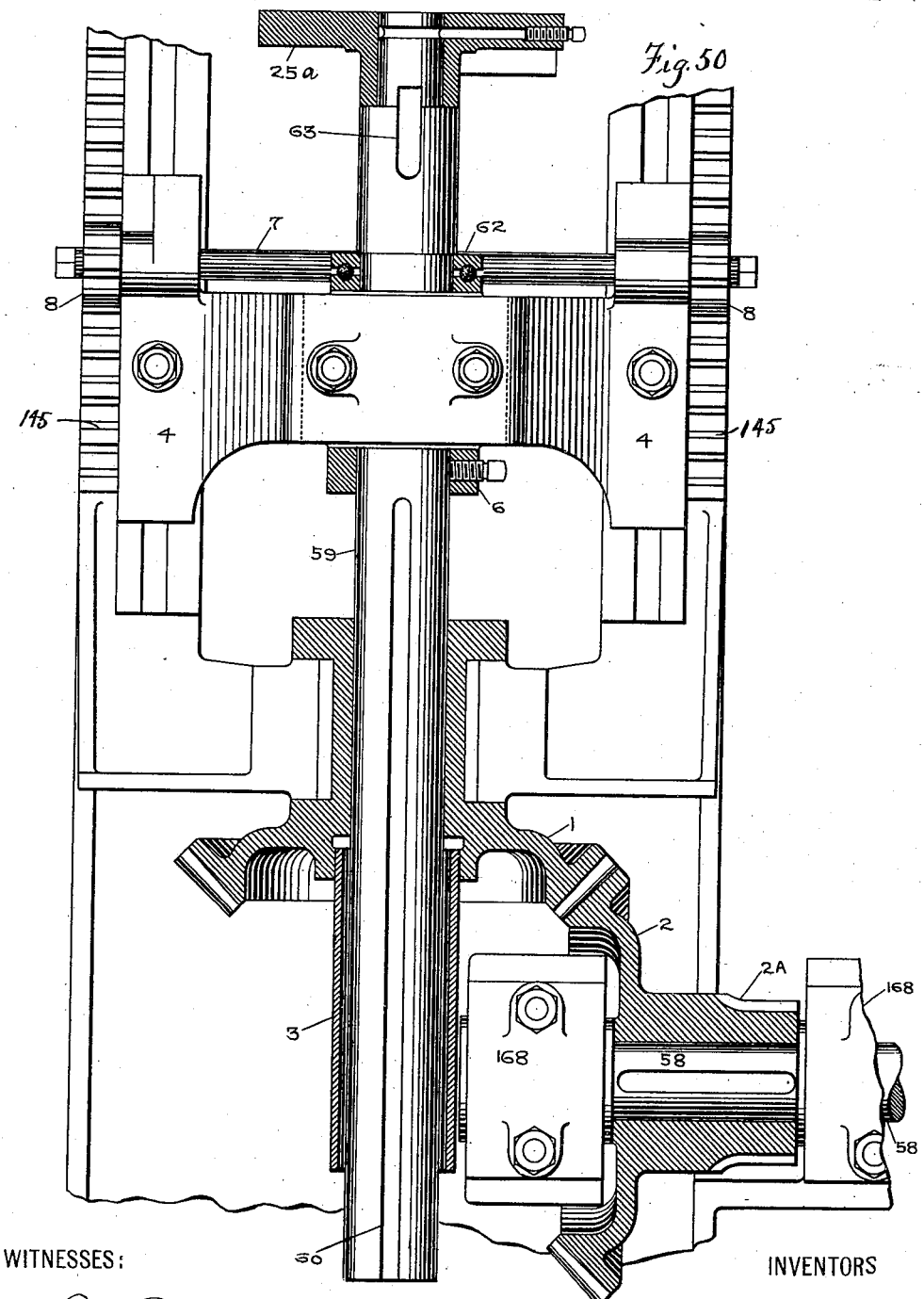

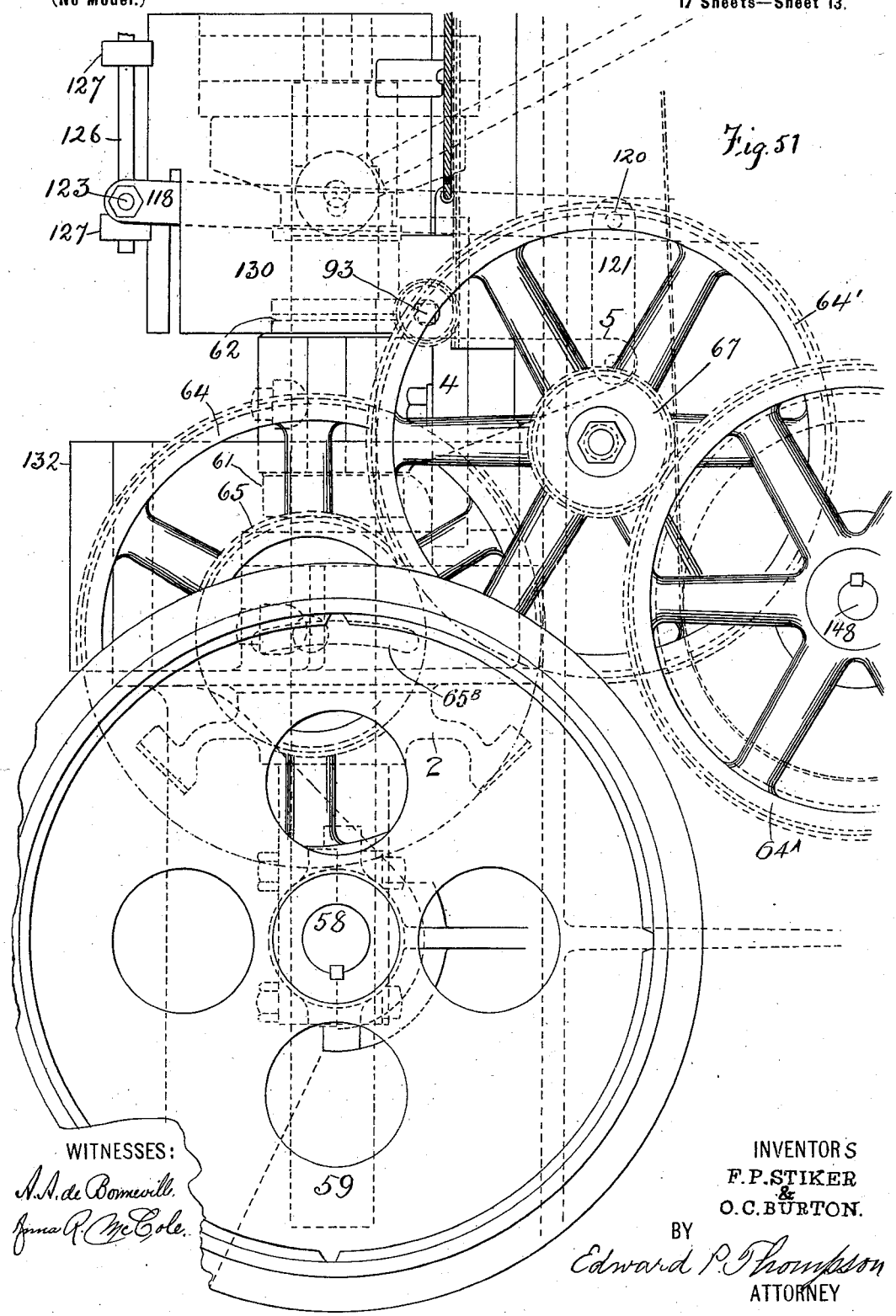

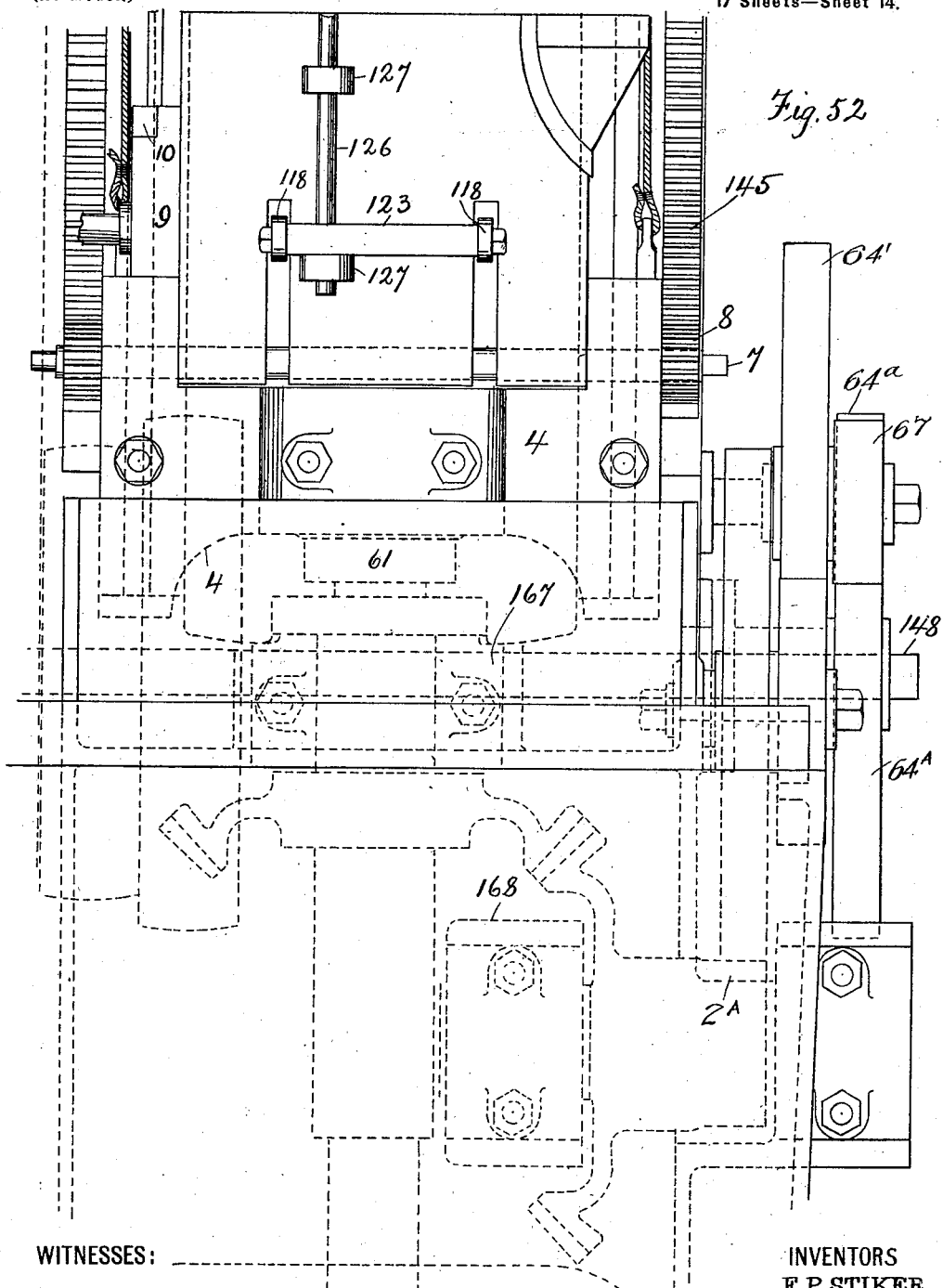

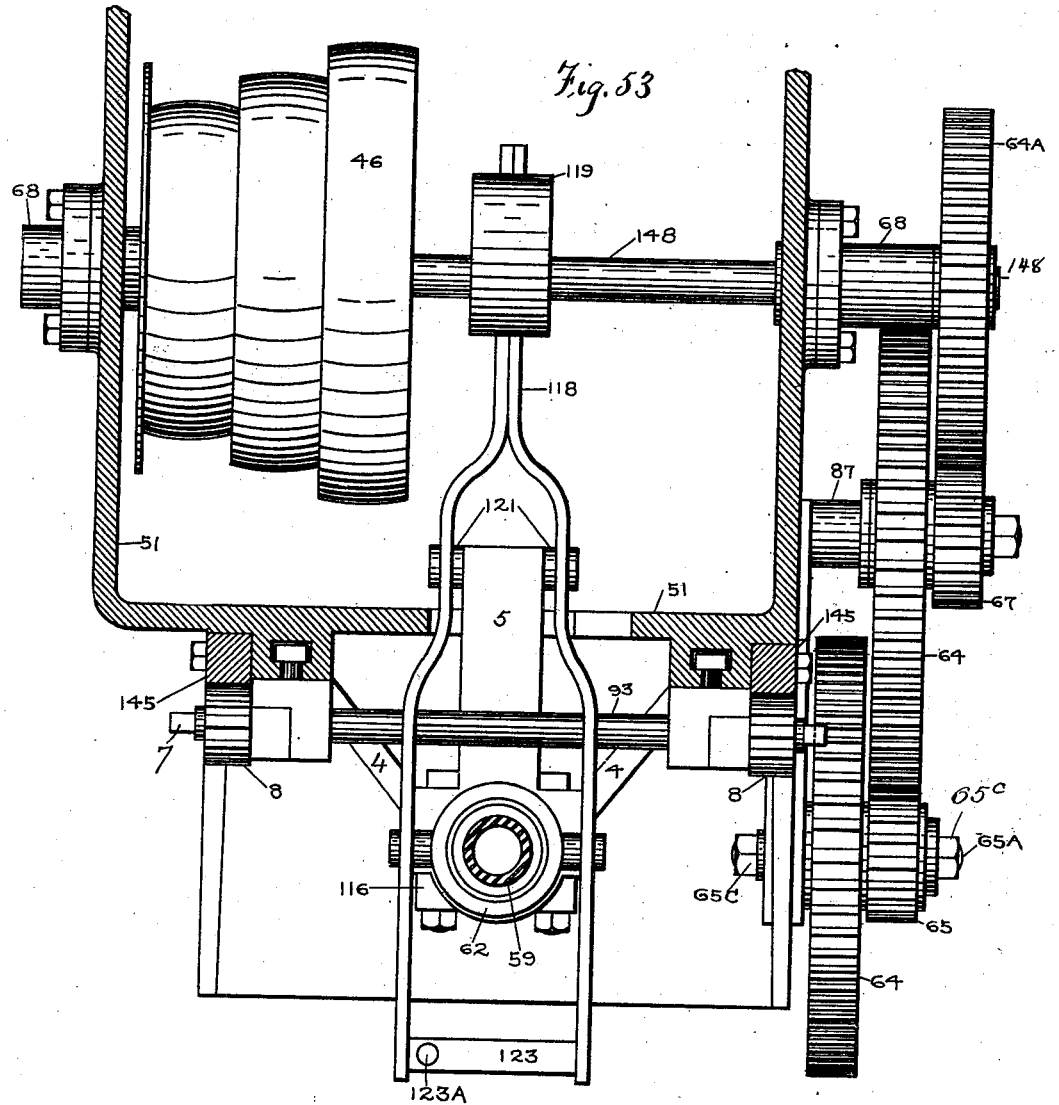

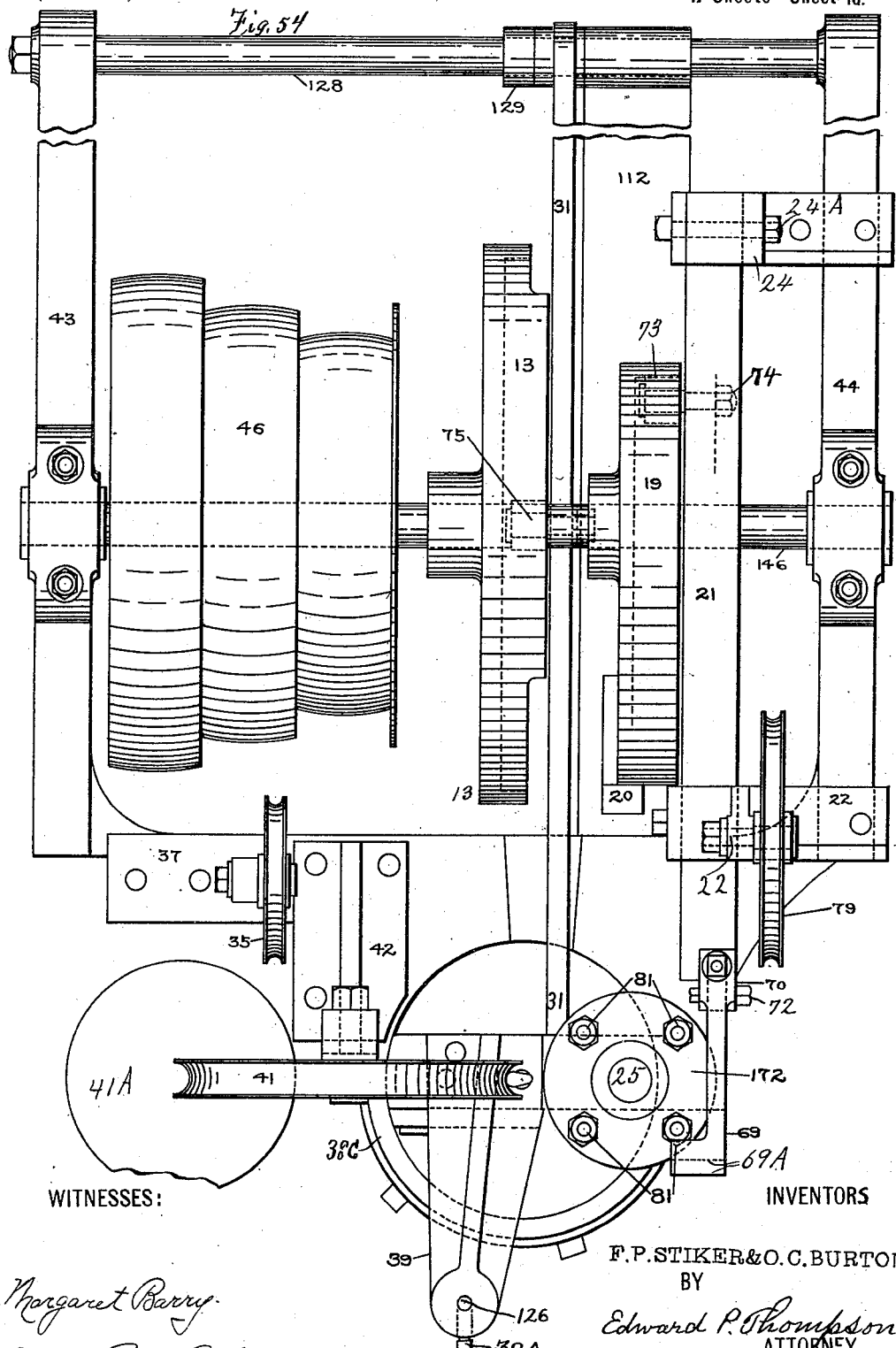

No. 707,272. Patented Aug. 19, 1902.
F. P. STIKER & O. C. BURTON.
METAL DRESSING MACHINE.
(Application filed July 30, 1901.)
(No Model.) 17 Sheets—Sheet 17.

Witnesses
Edward C. Rowland
Anna R. McCole

Inventors
F. P. STIKER & O. C. BURTON.
By their Attorney
Edward P. Thompson

UNITED STATES PATENT OFFICE.

FLAVIUS P. STIKER, OF BUFFALO, AND ORVILLE C. BURTON, OF NORTH TONAWANDA, NEW YORK.

METAL-DRESSING MACHINE.

SPECIFICATION forming part of Letters Patent No. 707,272, dated August 19, 1902.

Application filed July 30, 1901. Serial No. 70,210. (No model.)

*To all whom it may concern:*

Be it known that we, FLAVIUS P. STIKER, a resident of Buffalo, in the county of Erie, and ORVILLE C. BURTON, a resident of North Tonawanda, in the county of Niagara, State of New York, citizens of the United States, have invented certain new and useful Improvements in Metal-Dressing Machines, of which the following is a specification.
The general object of this invention is to provide a machine for dressing pieces of metal which are held by one end while dressed, milled, or threaded on the other end, one of the applications it can be put to being to cut threads on bolt-blanks, and we will describe the same as arranged for that purpose.

The invention relates to that class of machine which is adapted to receive bolt-blanks automatically from a chute, to thread the bolts automatically, and finally to discharge them automatically into a discharge-chute.

The general objects of the invention are, first, to provide a machine which is adapted to thread bolts automatically and as rapidly as consistent with maintaining the temper of the dies, to automatically and continually remove chips from the threading-head, to thread the bolts in a vertical position, and, more generally, to enable one operator, who may be a boy or inexperienced person, to run about ten machines at a time, while one man in addition can maintain in order and adjust a much larger number and at the same time have general superintendence of other matters about the works.

While the invention is simple in principle, yet the explanation without a model is necessarily somewhat complex on account of the numerous views required; but the machine will be more easily understood if the elementary motions of the bolt are followed in advance of any other description and without regard to any special design of machine. At the beginning of the operation, therefore, numerous bolt-blanks or bolts without threads hang vertically by the head, one behind the other, in an inclined chute, ready to move forward by the action of gravity. The nature of the chute need not now be set forth, as it would not simplify the analysis of the motions of the bolts. A gate opens at the front end of the row of bolts. The front bolt by gravity of itself and of the other bolts starting it by gravity falls out of the chute and is caught in the notch of a wheel, which serves as the bolt-carrier until the bolt is discharged. The other bolts do not fall out of the chute, because the gate or hook is driven back to its original or normal position and retains the remaining bolts in the chute; but all of them have moved downward through the space of one bolt to take the place of the one which has been released from the chute. In the first place the bolts are usually placed in the chute a large number at a time or in succession by hand. The gate opens to transfer a bolt from the chute to the carrier. The notched bolt-carrier turns through a quarter of a rotation and brings the bolt-axis directly over the center of the dies. A quarter of a rotation is mentioned merely because the notched carrier in this particular machine has four notches equally distant from each other. Two or more notches, however, may be employed and the rest of the machine timed accordingly. The bolt is supposed to have a square or hexagonal head, or part of its shank square or any head whose two opposite sides are parallel and such portion as or has plane surfaces passes, during a quarter of a rotation of the notched carrier along a curved or arc-shaped groove or track, which serves to guide the bolt to and over the center of the dies and to hold the bolt from turning in its axis while it is in the dies for threading. As soon as the bolt stands vertically over the center of the dies its carrier stops its rotary motion and with a plunger acting from above moves downward, pushing the bolt not only until the bolt arrives at the dies, but also until the dies by cutting a few threads have gripped the bolt, and then the motion of the bolt is continued by the pulling force of the dies while continuing to cut the thread on the bolt. The said plunger and carrier are pushed down because carried by a vertical movable slide. When the full length of thread is cut, the jaws holding the dies are opened and the bolt is withdrawn from the dies while open and rises through the action of the notched carrier by which it is supported. This carrier then makes a second quarter of a rotation, carrying said bolt with it, which is guided out of the notch in the wheel and away from its center and enters a horizontal and then a downwardly-inclined discharge-chute. The reason the bolt moves away from the center of the carrier is because the square or flattened head travels along a straight edge or curved edge while the carrier is continuing to make the second quarter of a rotation. Thus the first bolt is disposed of. In a similar manner a second bolt has entered the next succeeding notch as said notch came in front of the feeding-chute, and while the first bolt was being carried from the center of the die to the discharge-chute the second bolt was being carried to the center of the dies. It is not necessary to analyze the motions of the second bolt, because they are a repetition of those of the first bolt.

More particularly, the organization comprising the invention consists of an inclined slotted chute, open at the upper end for receiving one bolt after the other and adapted to hold a number of bolts hanging by the head and limited in number only by the length of the chute. The lower end of the chute is provided with a gate, which is in the shape of a hook or finger with a portion bent at about right angles to its shank and adapted to be closed normally across the lower end of the slot in said chute. A spring under pressure or tension serves to hold the gate closed. The hook is pivoted in order that it may be turned against the resistance of said spring to open for the release of a bolt. This movement of the gate or hook is accomplished by the motion of a rod, which carries an inclined plane or wedge or beveled piece, and by a roller, which is carried by some part of the gate and which bears upon the inclined plane. When the rod travels in one direction, the inclined plane serves to open the gate, and when the rod moves back again the spring closes the gate. The next element in a general way consists of means for moving said rod, which is accomplished by a tripping device which constantly rotates and at regular intervals strikes a projection which is fixed upon said rod, which in turn is carried in bearings and adapted to receive reciprocating longitudinal motions. The tripping device moves the rod against the resistance of a spring, which acts as a retractile spring to force the rod back again when released by the tripping device. At the outside of the gate as measured from the chute is a notched carrier mounted upon a vertical spindle which has two motions, the one being intermittent rotary motion of one direction and the other being reciprocating motion longitudinally of the spindle, the one motion occurring during the intervals between the other motions. This notched carrier is at the lower end of the spindle, which extends upward through the whole length of a slide which is adapted to have reciprocating motion in a vertical direction. The spindle also projects above the top of the slide and carries a ratchet-wheel with as many teeth, consisting of pins on the top of the wheel, as there are notches in the bolt-carrier. Said teeth project downward on the under side of said wheel, so that there are four projections on top of the wheel, near its periphery, and four projections on the under side of the wheel. The upper ones have the functions of the teeth of a ratchet-wheel, and the under ones are adapted to be locked by a pivoted lock or catch, which consists of a lever having a hole for receiving one of the pins on the under side of the ratchet-wheel. A spring constantly presses the catch upward, so that one of the pins will enter the hole at the right time. Provision is made to prevent the pin from sliding past the hole without being caught. A horizontally-reciprocating pawl for said ratchet-wheel also serves incidentally to depress the catch for unlocking the ratchet-wheel when the slide, with the bolt-carrier, rises. Evidently the object of the ratchet-wheel while rotating is to turn the notched carrier. The pawl has two functions—the one to unlock said catch and the other to turn said ratchet-wheel. It is the rising of the lock or catch against the pawl that unlocks the ratchet-wheel. Therefore the pin escapes from the hole in the catch to permit said wheel to rotate. Immediately after release the pawl travels horizontally, catches a tooth, and turns the ratchet-wheel through the proper distance to bring the bolt to the threading position, and the next pin is caught by the catch to lock the carrier in the same manner as the first-named pin. Thus far it is intended to show in a general way what the organization consists of for turning the bolt-carrier through quadrants. The pawl is pivoted to its slide to be raised up manually; but it does not perform this function during the operation of the machine. A strong spring prevents the pawl from any upward motion around its horizontal pivot. This provision is made merely so that the operator may by manual force lift the pawl out of the way, so that the ratchet-wheel, together with the bolt-carrier, may in an emergency be turned by hand for the purpose of removing and replacing a defective bolt or one which may have become caught for some reason. This spring for the pawl is sufficiently and purposely powerful enough to resist motion when struck by the catch and to depress the catch without itself being raised around its pivot by the catch. It has been stated that the slide that carries the pawl is adapted to reciprocate. These motions are accomplished by a rotating cam, preferably grooved, which operates a pin or roller projecting from said slide. This cam has a constant and continuous rotation and is so curved and moved as to rotate the bolt-carrier every time and immediately after the latter reaches its highest point above the dies. This cam will be better understood as to shape hereinafter by reference to the drawings.

The machine is provided also with a second cam for moving the main slide and bolt-carrier vertically up and down through the medium of a lever which is connected to the slide by a sliding block-bearing. This lever passes into the center of the main slide, through which there is an opening and guides for the block, which of course must be slightly movable horizontally on account of the circular motion of the end of the lever and the rectilinear motion of the main slide. This sliding motion of the block is horizontal and at right angles to the direction of motion of the slide. The cam for moving this lever has a constant and continuous motion, being fixed to the same shaft as the other cam. It is the movement of this lever that pushes the main slide and carrier downward and which feeds the bolt toward and between the dies for a distance of a few threads; but afterward the threading process continues the motion of the slide with its bolt. The organization has now been set forth in a general way regarding the parts of the machine for taking care of the bolt from the receiving-chute to the dies, the same affording a statement of this portion of the whole machine. Counterweights are employed for the main slide and its adjuncts, which are necessarily heavy and which must be lifted against gravitation and lowered gradually.

The driving mechanism consists, essentially, of a driving-pulley or any kind of device for imparting motion to a shaft. This pulley is connected up with change gears for rotating a cone-pulley, which is belted to a second pulley on a shaft above, which carries the cams heretofore mentioned and also the tripping device for opening the gate at the lower end of the feeding-chute. The driving-pulley is also connected up with the head for carrying the dies by means of bevel or miter gearing, which transmits rotation to the vertical spindle of the head from the horizontal driving-pulley shaft. The head is carried by a cross-head, movable by racks and pinions along tracks somewhat in the nature of a table on a planing-machine.

The general organization comprising our invention consists, more specifically, of a chute adapted to support the bolts vertically, a gate at the lowest end of the chute to prevent the bolts from escaping and adapted to open for releasing one bolt at a time, a tripping device for opening said gate at predetermined intervals through the agency of a roller and inclined plane, a retractile spring for returning the inclined plane to its normal position, a retractile spring for closing the gate, the above springs acting in conjunction with each other, a notched carrier to receive the bolts when released by the gate, a pawl and ratchet-wheel and catch and driving-cam for turning said carrier to bring the bolt over the center of the dies, a main slide supporting the carrier, ratchet-wheel, and catch, a stop and guides acting on the head of the bolt for guiding the latter and for holding the bolt from turning during the process of threading, a lever operated by a cam for driving the bolt to engage with the dies and for feeding the bolt while a few turns of thread are being cut, said cam having a spring to act as a cushion in case the bolt strikes the jaws or other obstruction instead of entering the dies, said cam being also adjustable to different positions by means of an adjusting-screw, said spring also serving as a cushion in case the bolt is too long or the dies too dull to take hold.

Generically the leading feature of our invention, and definining the machine as a whole, consists of the combination, with dies constantly rotating in one direction only and intermittently opening, of a hollow head for the dies, an open tubular spindle vertically located and carrying said head, and a bolt-carrier intermittently rotating in one direction only, longitudinally reciprocating to and from the dies and adapted to suspend the bolt vertically over said hollow head and spindle.

The scope, novelty, and further definitions of the invention and parts thereof are set forth in the claims.

Figure 26:
Figure 27:
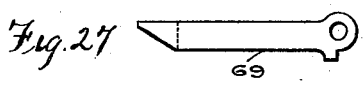
Figure 28:
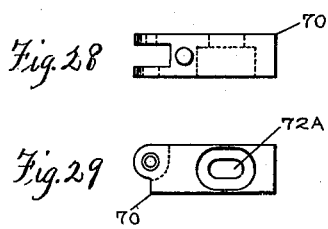
Figure 29:
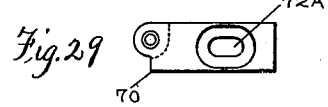
Figure 30:
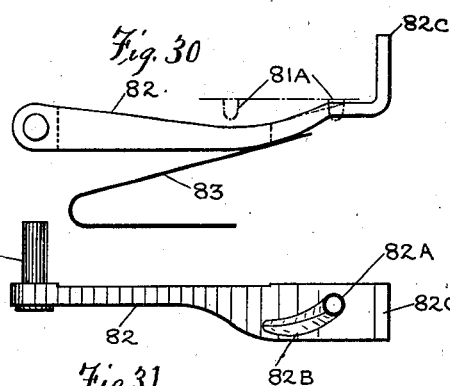
Figure 31:
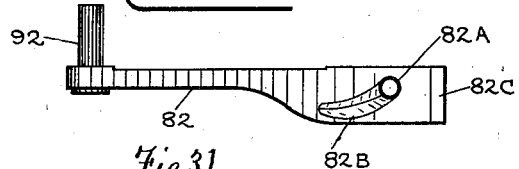
Figure 32:
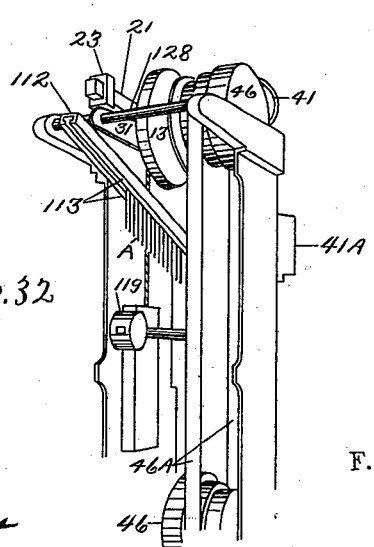
Figure 55:
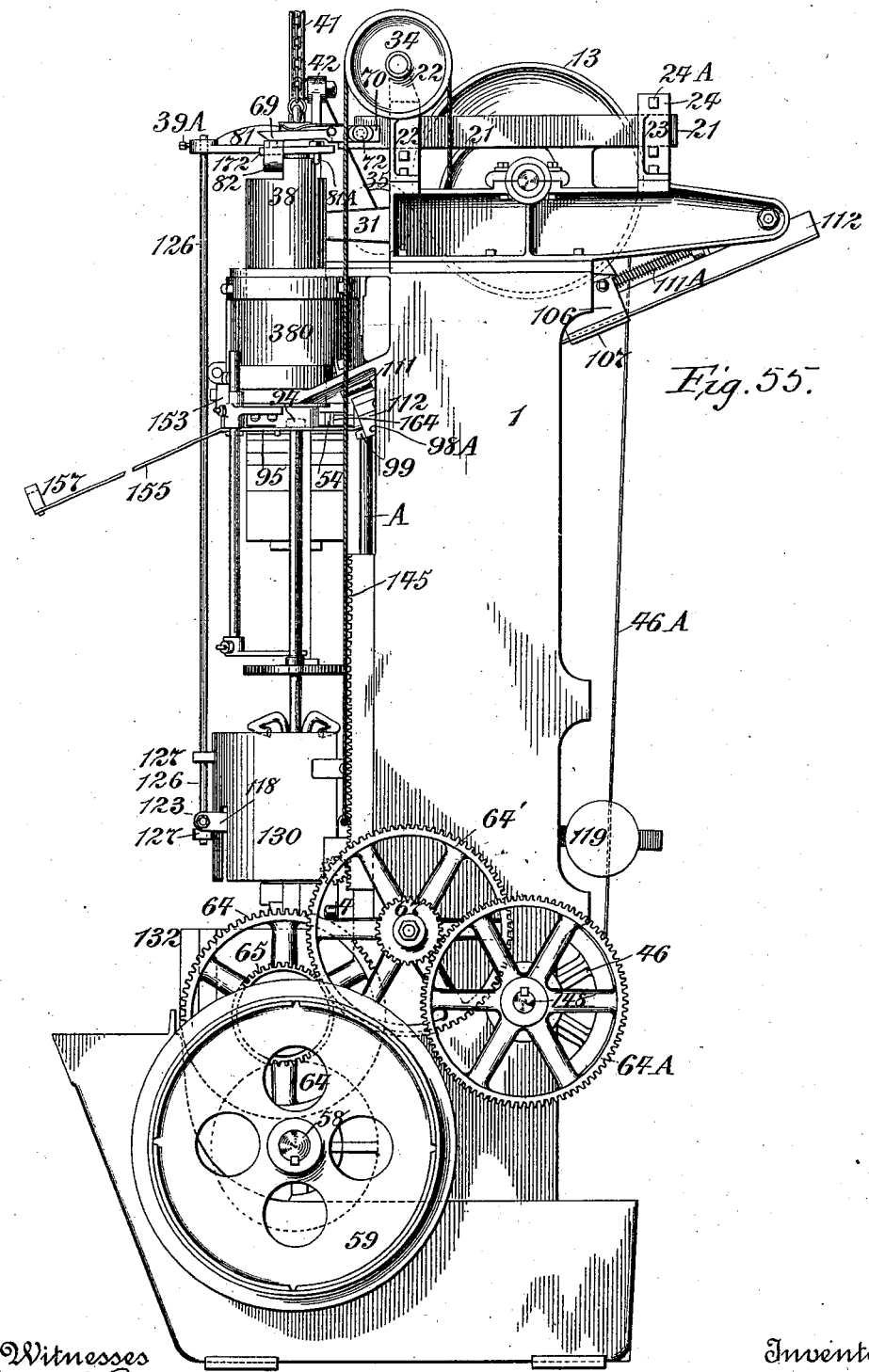

Figure 1 is a front elevation of the complete frame of the machine, including the barrel for containing the reciprocating slide. Fig. 2 is an elevation of the right-hand side of the same frame. The above two figures will assist in identifying the relative locations of the different elements of the machine. Fig. 3 is a plan of the hollow rotating head, openable jaws, and dies. Fig. 4 is a front elevation of that part of the machine which is involved in the manipulation of the bolt. Some of the upper and lower portions are broken away to bring the drawing within the scope of the sheet; but substantially the whole width of the machine is shown. The barrel, already referred to, may be seen at the center of the figure, and also the racks of Figs. 1 and 2 at the lower part of Fig. 4; but they pertain to the working of the die-head. A bolt A, having a head A', may be seen in Fig. 4 about to slide down the discharge-chute tracks 155 and 156, connected at the lower end by the arch 157. There are certain brackets 42 43 44, &c., on top of the frame, but omitted from Figs. 1 and 2. The rod 126 is shown connected at the upper part of the figure; but its lower end is connected up for opening the dies with a lever 118, as shown in Figs. 52 and 53. All above the barrel $38^C$ is omittted from Figs. 1 and 2. Fig. 5 is an elevation taken from the right-hand side of substantially that which is shown in Fig. 4, except that the figure omits some of the lower portions of Fig. 4 and includes some of the upper portions not shown in Fig. 4. The barrel $38^C$ may be seen at the left. The dotted lines indicate portions which are invisibly located behind other parts. The phase is that in which a bolt is about to be discharged, the slide 38 being in its uppermost position. The dotted arcs and spirals and other curves around the shaft 146 are outlines of the cams for reciprocating the slide and for rotating the carrier through intermediate mechanisms. Fig. 6 is a side elevation of the same side as shown in Fig. 5 of the main slide, the cam for operating the same, and the intermediate mechanism. The phase is the same as shown in Fig. 5, and the parts belonging to this movement may be easily understood, whereas they are too much mixed up with the other parts of the machine to be understood without referring to Fig. 6. The dotted lines represent hidden parts. The lower part of the frame is omitted. Fig. 7 is a diagram of the same movement as shown in Fig. 6; but the phase thereof is entirely different, the dotted circles 75 showing several but very few of the positions of the roller relatively to the cams 14 and 13$^C$, carried on the wheel 13, which rotates continuously, while the lever 31, having its fulcrum entirely at the right hand omitted, is adapted to move the slide 38 up and down. Said slide is partly pushed down in the figure by the action of the cam 14 on the roller 75 of the lever 31, which is shown by short dots, while other positions relative to the cams are shown by alternate dots and dashes. The arrow 13$^B$ indicates the direction of rotation. Fig. 8 represents the other rotary cam, the rotary bolt-carrier, and the intermediate mechanism in elevation from the same side as shown in Figs. 5 and 6, some other elements being included also in order to identify important relative locations. The phase is the same as in Fig. 5. As before, dotted lines represent hidden parts. The arrow indicates the direction of rotation of the cam. Figs. 7 and 8 locate the cams the one above the other for the sake of clearness; but in practice the one is behind the other, as in Fig. 5. Fig. 9 is an elevation of the reverse side of the cams shown in Fig. 7 to indicate the stops and springs and pivots that are on the opposite side of the wheel 13 in Fig. 7. The cams, however, are shown dotted. The wheel is also turned to a different degree. Fig. 10 is a side elevation of the cams and cam-wheel as projected from Fig. 9, most of the other elements being omitted. Fig. 11 shows one of the details—namely, the cam 14—with its adjuncts, as taken from Fig. 9. Figs. 12 and 13 are views similar to Figs. 9 and 10 of the cam for turning the rotary bolt-carrier. Figs. 14 and 15 are side and plan views of the pawl and its slide and cam-roller for turning the ratchet-wheel which rotates the bolt-carrier. Two positions of a tooth of a ratchet-wheel and its arc-shaped path are shown dotted in Fig. 15. Figs. 16 and 17 are side and plan views of the lever and its cam-roller and block for reciprocating the slide 38. Some of the central portion of the lever is broken out. Fig. 18 is a cross-section of said lever at the line X in Fig. 16. Figs. 19, 20, 21, 22, 23, and 24 are various views in elevation, plan, section, &c., of brackets and pulleys located on top of the frame, but not shown in Figs. 1 and 2. These figures, 19 to 24, are not sufficiently important to need further identification than by the reference-numerals. They are merely pulleys and brackets to be used in connection with counterweights for those parts of the machine having up-and-down movements, such as the cross-head and slide. As shown in Fig. 20, the bracket 22 for supporting the pulley 34 also forms a guide for the pawl-slide 21. Fig. 25 shows the bolt-carrier, its spindle, and the ratchet-wheel for rotating the same, all represented as carried by the slide 38, through which said spindle passes, said slide being broken away and the rest shown in section. In Fig. 5 the same features are shown; but Fig. 5 does not show clearly any connection between the carrier-wheel 95 and the ratchet-wheel 172. In practice the axis of the spindle 25 is vertical. Figs. 26 and 27 are different views of the pawl for turning the ratchet-wheel 172. Figs. 28 and 29 are different views of the support for the pivot of said pawl, shown also in Fig. 5 and carried by the slide 21. Figs. 30 and 31 are an elevation and a plan of the locking-catch and its spring 83 for the stump 81$^A$ shown dotted in Fig. 30. Fig. 32 is a general perspective view of most of the machine as seen on different sides from those shown in Figs. 4 and 5. The bolts are shown hanging vertical in the feeding-chute, and the upper cone-pulleys are shown belted to the lower cone-pulleys. Figs. 33 to 40, inclusive, relate to the feeding-chute and its adjuncts. Figs. 33 and 34 are respectively a plan and right-hand end view of the feeding-chute, which is shown horizontal. The spring 115 is omitted from Fig. 34. The chute is shortened by breaking out some of the central portion. Fig. 35 is a side view of what is shown in Fig. 33. Fig. 36 is a plan of the gate, its retractile spring, and the lever upon which it is bolted. Fig. 37 is a side view of Fig. 36. Fig. 38 is an end view of the lever 98. Figs. 39 and 40 are different views of the inclined plane employed for opening said gate. Fig. 41 is intended to show a plunger for pressing down the bolt against the dies when said bolt is held by the bolt-carrier. The plunger is supported by the slide 38. Fig. 42 is a plan of the carrier by itself. Fig. 43 is a cross-section of the same, showing a bolt held in one of the notches with the head resting on the upper surface of the bolt-carrier. Fig. 44 is a side view of the discharge-chute by itself projected from Fig. 45. Fig. 45 is a plan, partly in section and partly dotted, of the bolt-carrier, the feeding and discharge chutes, and guides for the head of the bolt. Some of the bolts are indicated by small dotted circles and squares. Figs. 46 and 47 are different views of the guide-piece for directing the head of a bolt from the exit of the feeding-chute to the position for threading, and hence to the mouth of the discharge-chute. Fig. 48 is a view similar to Fig. 45 on an enlarged scale, showing also a small portion of the slide 38 and the top of the feeding-chute which is shown in section in Fig. 45. Fig. 49 is a perspective of the inclined plane and the rod attached thereto. Fig. 50 is a vertical elevation, partly in longitudinal section, of the mechanism, which is adapted to show that the machine has a constantly-rotating head for the dies. Some of the parts are omitted from the figure, but may be seen in other figures. This figure shows principally the rotating head 25ª, adapted to be turned by the bevel or miter gear wheels 1 and 2, and a cross-head 4, adapted to be raised and lowered by the pinions 8, which engage with the racks 145. Those parts which are shown in section are sectioned on the same plane, while other parts standing in front of that plane are not shown in section— as, for example, the cross-head 4. Fig. 51 is a right-hand side elevation of what is shown in Fig. 50, together with practically all the remaining elements, the hidden parts being shown dotted. The figure illustrates the change-gear wheel, shows the die-head, and 126, which connects the slide 38 with the lever 118 for opening the dies, while the dies and the mechanism between the same and the lever 118 are common in prior machines, and therefore are not represented. Parts not lettered or numbered have nothing to do with the present invention, although they belong to the completed machine. Fig. 52 is a front elevation of substantially what is shown in Fig. 51, and therefore assists in understanding the construction represented. Fig. 53 is a cross-section through the lower part of the frame and shows the change-gear mechanism and the lower cone-wheel; also, it represents a better view of the lever 118 and how the same is connected to the sliding collar 62 on the hollow spindle 59 of the die-head. Fig. 54 is a diagram of the top of the machine. It is not exactly a plan, because some of the parts below the upper parts are omitted. The slide is omitted also and several other features, as the drawing is intended to illustrate the general appearance of a plan view to show the relative position of the cams, cone-pulleys, the barrels 38ᶜ, the pawl and ratchet wheel, and the frame. Fig. 55 shows practically all of the assembled machine and the relation of the parts as a whole, as far as possible, in one side elevation. The side taken is the left side, considering the machine looked at from the front, which is seen in Fig. 4. The opposite side or right-hand side of the upper portion is seen in Fig. 5. All the details cannot be shown clearly in one view, as the sheet is too small. Notice that the machine has two principal portions, the lower relating to the driving mechanism and devices for managing the dies and the upper to the means for manipulating the bolt.

As usual, like parts are represented by like numerals and letters of reference.

The inclined feeding-chute is numbered 112, and it consists of a long piece having a longitudinal slot running the whole length, the slot being on the lower side, where there are strips 113 projecting inwardly to form rails or tracks upon which the bolt-heads may rest. The heads of the bolts being square, hexagonal, or any form with paralled sides are prevented from turning on their axes and are therefore in a position to enter the bolt-carrier. There are holes 112ᴬ through which defective bolts may be removed without the necessity of removing all the bolts. The roof 112ᴮ of the chute is considerably higher than the bolts to permit a spring to be located there, which by means of the set-screw 115ᴬ may be adjusted to just escape the tops of the bolts. By this means the bolts drop more gently and satisfactorily from the chute to the bolt-carrier. The chute 112 is always stationary with the frame and is adapted to hold a very large number of bolts, which may be fed into the upper end by hand or in any other convenient manner, provided the heads of the bolts rest upon the tracks 113.

The gate for releasing one bolt at a time will now be described. It is numbered 99 and is bolted adjustably by slots 98ᴬ and bolts 98ᴮ to a rectangular plate 98, which serves as a lever, the pivot-pin of which is 101, so that the gate or hook 99 may swing back and forth. This pin is carried in the hole 98ᶜ in the chute 112, the hole being on the top of the chute. This angular plate 98 carries a pin and roller 102, which latter is operated by an inclined plane for opening the gate. The roller 102 is held away from the plate 98 by a collar 103. The roller 102 is rigid with the gate 99 and with the plate 98, except that the roller may rotate on its pin. The gate 99 is held in a yielding manner in its normal position for retaining the bolts in the chute by means of a spring 100, which is fixed to the side of the angular plate 98 and extends and presses against the chute or a suitable abutment. The inclined plane 104 is fixed upon the lower end of a long rod 111, which is adapted to have longitudinal movements in bearings, one of which is 105. This rod 111 carries a slide 106, which is movable along the chute 112 by having inwardly-projecting strips 107 on the under side of the chute. This slide carries a projecting lug 108, lying in the path of a constantly-rotating tripping-finger 20, which moves around the shaft 146 and is therefore conveniently attached to one (19) of the cams carried upon said shaft. This slide 106 is adjustably fixed to the rod 111.

110 represents stops or collars, the upper one being an abutment for the spring 111ᴬ, surrounding the rod 111 and abutting against the slide 106, said spring being a retractile spring to return the rod 111 after being moved upward by the tripper 20. The lower stop 110 being fastened to the rod 111 limits the downward motion of said rod by striking against the abutment 105. The function therefore of the rod 111 is to move the inclined plane 104, which in turn moves the gate 99 for opening the gate, while the function of the spring 100 is to close the gate again before the second bolt can fall from the chute to the bolt-carrier. This movement is insured by the location of the tripper on the cam-wheel 19. By "inclined plane" we mean a block 104, having a surface 104$^A$, which slants laterally with reference to the roller 102, so that when the inclined plane moves longitudinally with the rod 111 the roller 102 is obliged to move away from said rod, and therefore tilt the lever-plate 98 and with it the gate 99.

It is immaterial how the tripper 20 is caused to intermittently move the lug 108, and thereby open the gate 99; but said tripper is conveniently carried by mounting it upon the cam 19. In brief, the inclined plane 104 opens the gate 99 and the spring 100 closes said gate again. This step is repeated every time the tripper 20 operates the rod 111 and must take place every time that a bolt is to be fed into the bolt-carrier wheel.

The bolt-carrier consists of a notched wheel, the notches being of a size slightly larger than the diameter of the bolt and all the notches being equally spaced around the periphery of the wheel. These notches are numbered 95$^A$. They are small enough in width to permit the under surface of the head of a bolt to rest upon the wheel. As a mere matter of convenience the wheel 95 is provided with four equally-spaced notches. It is evident that there would have to be at least two such notches, the machine being timed accordingly. The carrier-wheel 95, as hereinafter described, moves up and down; but in its uppermost position one of the notches 95$^A$ is directly opposite and close to the lower end of the tracks 113 of the chute 112, for the evident purpose of being ready to receive a bolt when it is released by the gate 99. The principal function of the rotary bolt-carrier 95 is for taking a bolt to a point over the center of the dies and subsequently for feeding said bolt from the center to the discharge-chute. As this description is following the steps undergone by the bolt in order from the beginning to the end, the next feature which may best be understood is the arrangement for rotating the carrier 95 for bringing the bolt over the center of the dies. However, to keep the attention at the same part of the machine we will first assume that said carrier makes a quarter of a rotation and notice how the bolt A is prevented from turning on its axis when it arrives at its central position and is about to be fed to the dies. For this purpose we provide a stationary guide 54 for the head of the bolt just above and near the periphery of the bolt-carrier 95 and extending about quarter-way around, beginning at about the lower end of the feeding-chute and reaching to the upper end of the discharge-chute 155 156. The guiding-tracks 54$^A$ are curved to form an arc around the center of the carrier 95 except at the ends, where these tracks are not curved. At the discharge end the tracks are rectilinear and parallel, as shown at 54$^B$, and they are located at the end of the guide at the head A' of the bolt A. There is as close a fit as practical or as will serve to hold the head A' and therefore the whole bolt A from turning. At the feeding end of these tracks 54$^A$ the one nearer the center is directly opposite the lower end of the feed-chute 112, while a portion of the guide 54 is cut off for terminating the outer track 54$^A$, which would otherwise cover the end of the chute and prevent the exit of the bolts from the chute and their entrance to the carrier 95. The hole 54$^C$ is for the passage of the plunger 55$^A$. The plunger must pass through this hole in order to press upon the head of the bolt to act as a resistance. The support for the guide 54 is the main slide 38, to which the arcs of the tracks 54$^A$ are eccentric; but the tracks 54$^A$ terminate concentrically at the threading position under said slide, so that the vertical axis of the slide coincides with the vertical axis of the bolt while in a position for threading.

We will now describe in detail the means for rotating the bolt-carrier for transporting the bolt while hanging vertical from the feeding-chute to the position for threading.

The spindle 25 of the carrier 95 passes through the whole length of the slide 38 and carries at the upper end a ratchet-wheel 172, consisting of a disk made rigid with said spindle by means of a key 25$^A$. It is called a "ratchet-wheel" because there are pins passing through the disk at equal intervals circularly and projecting out both from the upper surface and from the lower surface, the upper portions forming teeth 81 and the lower portions forming stumps, which are adapted to be held by a lock or catch. When this ratchet-wheel turns about its axis, it is evident that the bolt-carrier turns with it, for the two elements are on opposite ends of a spindle 25. The element for communicating rotation to the ratchet-wheel 172 is a pawl 69, in whose path the teeth 81 are successively located as often as the bolt rises out of the dies to its highest point. As soon as the wheel 172 is turned to the proper position for threading the bolt it is locked by a catch 82, which consists of a lever having a hole in the path of the stumps 81$^A$ and pivoted to the slide 38 by a pivot 92. This catch 82 is continually pressed upward by a spring 83, which is also carried by the slide and bears upward on the under side of the catch 82. The hole in the catch is numbered 82$^A$, and it is at the end of a tapering groove 82$^B$, formed in the catch and serving as a guide for any one of the stumps 81$^A$, which cannot, therefore, slip past the hole 82$^A$ without striking the side of said hole and being caught. The catch is terminated by an upwardly-formed hook 82$^C$, the function of which is to depress the catch 82 when rising up with the slide against the pawl 69 and to release a stump 81^A. Said pawl 69 has a hook 69^B, which latter serves to catch the teeth of the ratchet-wheel. The motion of the pawl 69 is transverse to that of the lock or catch 82, and the depression of the catch occurs by the rising of the slide which supports said catch. The escape of the catch from a stump 81^A frees the ratchet-wheel 172 from the catch. Each tooth 81 and stump 81^A consist simply of a pin threaded and shouldered at its central portion at 81^B. The shouldered portion 81^B is an enlarged hexagonal head above which projects the tooth 81. The pivot-pin for the pawl 69 is 71, which passes through the pawl and through a pawl-holder 70, which is adjustably held by a screw 72, passing through a slot 72^A and into a slide 21 near its end. By means of the screw 72 and the slot through which it passes the pawl may be adjusted longitudinally with respect to the slide 21. There is a strong spring 84 fixed to the pawl-holder 70 and bearing downward upon the pawl with sufficient power to prevent its being lifted by any automatic action of the machine, and yet weak enough to permit the operator to turn the pawl upward manually. The spring 84 is fastened to the pawl-holder 70 by a screw 70^A.

The slide 21 is provided laterally with a roller 73 on a pin 74, which is held upon a lug 74^A on the lower side of the slide, the roller being at one side of the lug. This is the roller which is operated by a cam. The function of the slide is to move longitudinally back and forth for turning the ratchet-wheel 172 intermittently. One of the guides for the slide is 23, and consists of a slotted bracket. The slide is located in this slot or notch 23^A, which is covered by a holding-plate 24 by bolts 84^A. The bracket is fastened upon the frame of the machine, and there is another bracket of the same kind and for the same purpose and modified only by a little pillar 22 for carrying a pulley 79. The two guides serve as the support and track for the horizontal longitudinal movements back and forth of the slide 21, whose movements are supplied entirely through the action of a cam 19. The mathematics of this cam need not be entered into. It consists of a disk or wheel or plate having on one side a track whose width is equal to the diameter of the roller 73. Going around the track, the curvature from $e$ to $f$ is an arc drawn from the center of the shaft 146 and the length of about ninety degrees. The function of this portion is to hold the pawl 69 directly over that tooth 81 which is to be caught by it while the main slide is moving up. From $f$ to $g$ the cam has a slightly double curvature away from the center of the shaft for moving the slide back so as to turn the ratchet-wheel 172, the ratchet-wheel being first unlocked from turning by the catch 82. The arrow 19^A shows the direction of rotation of the cam 19. From $g$ to $h$ the curvature is an arc, which serves to hold the pawl 69 in a free position away from the ratchet-wheel 172 till the slide and said wheel move down again. From $h$ to $e$ the cam is a spiral gradually approaching the shaft 146 for moving the pawl 69 again directly over the ratchet-wheel ready to catch one of its teeth 81. Therefore the pawl moves first over the ratchet-wheel and then remains there awhile, then moves back again, remains there awhile, and then moves forward again over the ratchet-wheel, and so on repeatedly. After the ratchet-wheel has been turned for the purpose of bringing the bolt over the center of the dies the slide carrying the same must be depressed. We will now describe the means for driving the slide downward and raising it. To relieve the weight of the slide, a counterweight 41^A, pulley 41, and a chain 41^B are provided for securing approximate equilibrium. The slide is provided with an opening and block 77. This block is pivoted by a pin 79 to the end of a long lever 31, whose function is to move the slide up and down. The other end of the lever is pivoted to the rod, while at or near the central portion of the lever there is a roller 75, pivoted thereto by a pin 76 and adapted to be moved by cams formed upon a wheel 13. The cam for depressing the lever is numbered 14 and is provided with a pivot 14^A and a pin 14^B. The cam is pivoted to the wheel 13 and is held away from the center of said wheel by a spring 17, while a set-screw stop 17^A adjusts the limit of the outward movement of said spring, while if the cam 14 is pressed forcibly inward the spring 17 will yield accordingly. The spring itself is also adjustable by being carried upon a lever 15, pivoted at 16 and adjustable by the set-screw 16^A. Any pressure therefore upon the cam 14 will, if sufficient, force said cam toward the center of the wheel 13. The roller 75 rides under the cam 14 by the rotation of the wheel 13 in the direction of the arrow 13^B, and if the bolt should not enter the dies or a similar mishap should occur nothing will be broken, because the cam 14 will yield. The wheel 13 is also provided with a cam 13^C, which extends from the periphery spirally toward the center ready to feed the roller 75 to the circular cam 13^A some time after said roller has left the cam 14. During the freedom of said roller from the cam 14 and before it reaches the cam 13^C the threading of the bolt has pulled down the slide 38, and while the roller 75 is upon the cam 14 said slide is being pushed down toward the threader by said cam and the threading thereby commenced. The cam-wheel 13 is fixed upon the same shaft 146 to which is fixed the cam 19. The slide itself, 38, does not bear directly upon the head of the bolt for driving the latter into the dies, but carries a steel-headed plunger 55.

Without stopping now to describe the construction of the lower part of the machine at length it will suffice to say that the threading-head after a few threads have been started by the combined action of the pressure of the plunger 55ᴬ and the lever 31 pulls upon the bolt and feeds the same inwardly on the same principle as all threaders.

The means for opening the jaws at the right time will now be described. To this end the slide 38 carries a bracket 39, extending laterally and provided with a hole and set-screw 39ᴬ for holding the ends of a long vertical rod 126, carrying near the lower end upper and lower adjustable collars 127, acting as lugs or projections for tilting a lever 118, forked at one end and connected by the piece 123, which serves to be actuated either up or down by one of the collars 127, the rod 126 passing through the hole 123ᴬ in the connecting-piece 123. The lever 118, whose pivot is 120, is connected up with the jaws in such a manner that when the upper collar 127 pushes down the lever 118 the jaws are open, and when the lower collar 127 pulls upward again on the lever 118 the jaws are closed. By fixing the collars 127 at particular locations the jaws will open and close at exactly the right time, respect being had to the different positions of the bolt in the dies. If the thread is to be rather long, the upper collar 127 would be adjusted rather high on the rod 126.

119 is merely a counterweight on the lever 118.

121 is a link for supporting the pivot or fulcrum 120, and said fulcrum is carried upon a bracket 5, extending from the cross-head 4.

The hollow spindle 59 supports the threading-head and is carried by a ball-thrust collar 62, resting on top of the cross-head 4. The lower end of the spindle passes through the miter 1 and is caused to rotate with it by means of a spline. The up-and-down movement of the lever 118 respectively closes and opens the jaws of the threader; but it is unnecessary to explain about these jaws, because their construction and operation have nothing to do with the invention; but it should be noticed that the head and the spindle carrying the same are hollow, so that the chips and oil may fall through downward without clogging or injuring any of the mechanism. The head is numbered 25ᵃ.

130 is merely a cylindrical guard to prevent the oil from flying outward. By collecting on the inner side it may be drained off.

On the hub of the miter-gear 2 a spur-pinion 2ᴬ is cut and gears into and drives a spur-gear 64, the sleeve of which carries also the change-gear 65, which is for the purpose of varying the speed of rotation of the upper cam-shaft 146. The pin 65ᴬ, on which the sleeve rotates, is secured in position in the segmental slot 65ᴮ in the frame by means of a nut 65ᶜ on the other end of the pin. This segmental slot allows the changing of the gear 65 for a smaller or larger one. A change in the speed of the cam-shaft 146 relatively to the speed of the threading-head accommodates the different pitches of threads to be cut. The change-gear 65 meshes into an intermediate gear 64, whose sleeve carries an intermediate pinion 67, which engages into the lower cone-shaft gear 64ᴬ, the shaft of the cone being 148 and the cone 46 having a belt 46ᴬ, driving the cam-shaft 146 by means of another cone 46', so that as in other arts different relative speeds may be obtained from a shaft having a constant speed. They allow a greater variation in conjunction with the change-gear than either would allow alone. The speed of the shaft 146 may first be adjusted partly by means of the change-gear to give the proper speed on the middle cone, and then by shifting the belt to the other cones the speed can be further diminished or increased, as it is intended to cut the thread on a bolt in about three-fourths revolution of the upper shaft. If it is desired to cut longer threads, the belt is shifted to the largest cone, thereby giving more turns of the threading-head to one of the cam-shaft 146. If a shorter thread is to be cut, the belt 46ᴬ is shifted to the small cone, which allows the cutting of the thread to be effected practically always in three-fourths revolution of the cam-shaft 146. If threads much longer than the average are to be cut, it would be necessary to change the change-gear 65 to a smaller one, because the cones do not permit sufficient variation for extreme conditions; but for ordinary work the cones will allow enough change.

The plunger 55 is for the purpose of lightly pressing the upper side of the bolt-head upon the carrier-wheel, so as to keep the bolt perpendicular.

By applying a wrench to the shaft 7 the pinions 8 may be turned, and as they engage with the racks 145 the cross-head 4 may be elevated or lowered to accommodate the different lengths of bolts to be threaded.

The gearing in the last five sheets of the drawings may be made clearer by noticing that Fig. 53 shows the cone-pulleys 46 at the lower portion of the machine, that Fig. 54 the pulleys 46' at the upper portion, and that the perspective view in Fig. 32 shows these pulleys connected together by a belt 46ᴬ. This belt is the only connecting propelling element between the gearing 64ᴬ 64 65 and certain other movable parts of the lower portion of the machine, as shown in Fig. 53, on the one hand and the cams 13 19 and other movable parts in the upper portion of the machine seen in Fig. 54. In fact, Fig. 32 and Fig. 55 show the connecting construction between the lower and upper portions of the machine. Fig. 53 may be further understood by looking at the front view thereof in Figs. 50, 51, and 52.

We claim as our invention—

1. The combination with dies constantly rotating in one direction only, and intermittently opening, of a hollow head for the dies, an open tubular spindle vertically located and carrying said head, and a bolt-carrier intermittently rotating in one direction only, longitudinally reciprocating to and from the dies, and adapted to suspend the bolt vertically over said hollow head and spindle.

2. The combination with dies, of a bolt-carrier intermittently rotating in one direction only, for bringing the bolts successively to predetermined positions, a cam and lever for forcing said bolt-carrier to and from the dies, and a driver connected up with the above-named elements for automatically operating the same.

3. The combination of a die-carrying head constantly rotating in one direction only and having a vertical axis, a reciprocating bolt-carrier intermittently rotary around a vertical axis, in one direction only, for bringing successive bolts with their axes vertical centrally over the dies, a device movable with said bolt-carrier for forcing said bolts successively to the rotating dies, and means applied only to the heads of the bolts to prevent them from rotating on their axes.

4. The combination of a die-carrying head constantly rotating in one direction only, and provided with openable jaws which support the dies, a bolt-carrier intermittently rotary in one direction only, for bringing one bolt at a time centrally over the dies, means for forcing said bolt-carrier toward the dies, and an adjustable device governed by said means for opening said jaws at predetermined intervals, and devices connected up with said bolt-carrier for respectively and intermittently preventing the same from turning, said device consisting of a pin, and a slotted lever adapted to catch said pin.

5. The combination with constantly-rotating and intermittently-opening dies, of a slide, a bolt-carrier supported by said slide and intermittently rotary in one direction only, for bringing the bolts to predetermined positions, the axes of the above elements being vertical, means for reciprocating said slide relatively to the dies, a driver connected up with the above-named elements for automatically driving the same, and a cross-head supporting said dies, and movable to and from said carrier.

6. The combination with dies constantly rotating in one direction, of a reciprocating slide for supporting a bolt, an adjustable connecting operating element between said slide and said dies for opening the latter, and a driver connected up with the above-named elements for automatically operating the same, racks on the frame of the machine, a cross-head supporting said dies, and pinions on the cross-head gearing into said racks for varying the distance between said carrier and said dies, and a second driver connected up with all the above-named elements.

7. The combination with dies, of a bolt-carrier rotary around and reciprocating along its axis, a slide supporting said carrier, means for opening and closing said dies, a connecting-rod between said slide and said means, and a yielding cam 14 for starting said slide.

8. The combination with dies, of a head for the same adjustable to different heights, a bolt-carrier, a reciprocating slide supporting said carrier, and an adjustable connection between said dies and said slide.

9. The combination with rotating dies, of a notched carrier-wheel, whose axis is vertical, for receiving bolts to hang vertical, and rotary around and reciprocating along its axis to and from said dies whose axis of rotation is vertical, a spindle to which said wheel is attached, a reciprocating slide forming a bearing for said spindle at one side of the center of said slide, means for moving said slide to and from said dies, and devices for bringing the centers of the bolts over the center of the dies.

10. The combination with rotating dies, of a bolt-carrier wheel rotary around and reciprocating along a vertical axis to and from said dies whose axis of rotation is vertical, said carrier consisting of a wheel having notches in its periphery equally spaced from one another, and large enough to receive bolts, and so arranged as to shape and position that the heads of the bolts rest by gravity alone upon the carrier around the edges of the notches, and means for pressing the heads of the bolts against the carrier, and a device independent of the carrier for guiding the heads of the bolts in a predetermined manner.

11. The combination with dies, rotating about a vertical axis, of a bolt-carrier, rotating about a vertical axis, means for discharging a bolt from said carrier, and a device simultaneously feeding a bolt with its axis vertical to said carrier, mechanism successively feeding said bolts while hanging with their axes vertical, to and from said dies, and a driver connected up with said elements and automatically driving the same.

12. The combination with dies rotating about a vertical axis, of a bolt-carrier for receiving, holding and discharging bolts consisting of a wheel having a vertical axis and having notches in its periphery equally spaced from one another, a hub on the wheel, a spindle passing through and connected to and detachable from said hub, a bearing for the spindle, and means for reciprocating said bearing to and from said dies, said means pressing upon the head of a bolt when held centrally over said dies.

13. The combination with dies, of a bolt-carrier with its axis vertical and having notches in its periphery equally spaced, a feeding-chute terminating normally at one notch, a discharge-chute beginning near a second notch which is centrally over said dies, and an openable gate between and in addition to the feeding-chute and the carrier.

14. The combination with dies, of a bolt-carrier adapted to receive, hold, transport, and discharge a bolt, a feeding-chute terminating normally at one portion of the carrier, a discharge-chute beginning near that portion of the carrier which is centrally over said dies, means for moving the said first portion of the carrier to the position of the second portion thereof named, and for bringing a new portion to the position of the said first portion and mechanism for reciprocating said carrier relatively to said dies, and a gate for said chute as an additional element to said chute and said carrier.

15. The combination with dies, of a bolt-carrier wheel with the plane of the wheel horizontal and having notches in its periphery equally spaced, and having the head of the bolt above said wheel, and the shank thereof below said wheel, a feeding-chute terminating normally at one notch with the bolts hanging by their head by gravity alone, a discharge-chute beginning near a second notch which is centrally located over said dies, devices for rotating said wheel, and guides jointly acting with the rotating force of said wheel only upon the head of a bolt for steering the same from its notch to said discharge-chute, which is adapted to support the heads only of the bolts with their shanks hanging vertical by gravity alone.

16. The combination with dies, of a bolt-carrier wheel with a vertical axis having notches in its periphery equally spaced, a feeding-chute terminating normally at one notch, a gate between the chute and carrier, means for opening and closing said gate, a declined discharge-chute with the upper portion horizontal beginning near a second notch which is centrally located over said dies, devices for rotating said wheel, and guides in addition to the other elements named for directing and moving the heads of the bolts tangentially away from said wheel and leading them to said discharge-chute, said guides being so arranged that bolts ahead are driven horizontally into the chute by bolts behind those ahead.

17. The combination with dies, of a bolt-carrier wheel with a vertical axis having notches in its periphery, a feeding-chute terminating normally at one notch, a discharge-chute beginning normally near the next notch which is centrally over said dies, said notches receiving the shanks of said bolts, the heads of the bolts resting by gravity alone upon the wheel around the notches, with the shanks hanging loosely vertical, stationary curved guides on opposite sides of the heads only, for guiding the heads of the bolts and extending between the two notches, the shanks of the bolts dangling entirely free, and another guide for the heads extending horizontally from the position of said second notch to said discharge-chute which is declined, the second guides being continuous with the first-named guides, and acting only on the heads of the bolts.

18. The combination with dies, of a bolt-carrier wheel for bringing the bolt centrally over the dies, and having notches in its periphery, a feeding-chute terminating normally at one notch, a discharge-chute beginning normally near the next notch, a horizontal chute leading from the carrier to said discharge-chute, the notches being only large enough to receive the vertically-hanging shanks of the bolts, the heads resting entirely by gravity on top of the wheel around the notches, means for rotating said wheel for carrying a bolt from the feeding-chute to said horizontal chute leading to the discharge-chute, and a guide-piece just above said wheel and having a groove for the bolt-heads extending between the two notches and shaped concentrically around the center of said wheel, the groove then becoming straight, instead of curved, from the position of said second notch to said discharge-chute, for the purpose of forming a part of said horizontal chute, and a vertically-reciprocating slide supporting said carrier-wheel, and said guide-piece, which is so arranged and shaped that the head of a bolt is maintained at a predetermined angle with respect to the discharge-chute.

19. The combination with dies, of a bolt-carrier wheel having means for holding a bolt, a feeding-chute and a discharge-chute terminating and beginning at different portions of said wheel, a guide for the head of the bolt between the two portions named and extending beyond that portion at which the discharge-chute is located, and having a hole, a slide supporting said wheel, and having a plunger-head passing through said hole and acting upon the head of the bolt, and means for depressing said slide together with the bolt-carrier centrally to said dies.

20. The combination with dies, of a bolt-carrier wheel having notches in its periphery, a feeding-chute terminating normally at one notch, a discharge-chute beginning normally near the next notch, which is centrally over said dies, said notches receiving the shanks of said bolts, the heads of the bolts resting upon the wheel and around the notches, a stationary curved guide-piece for guiding the head of the bolt and located between the two notches and extending beyond the second notch to said discharge-chute, said guide-piece having a hole centrally over the dies, a slide for supporting said carrier, and a plunger-head attached to said slide and adapted to bear upon the head of a bolt which is located just below said hole.

21. The combination of a rotating wheel having peripheral notches, a feeding-chute declined toward said wheel and normally terminating at one of said notches and adapted to hold bolts with their axes substantially vertical, a gate independent of the carrier and chute for retaining bolts in said chute and located between the latter and said wheel, a device for intermittently stopping said wheel, means for opening said gate, and a constantly-rotating cam for governing the intermittent stopping of said wheel.

22. The combination of a bolt-carrier rotating about a vertical axis, adapted to receive bolts, a feeding-chute normally terminating at said carrier and declined in a straight line, a gate for retaining bolts in said chute and located near the latter and near said carrier, and devices for intermittently stopping said carrier and opening said gate, which alone is adapted to release only one bolt at a time to fall by gravity upon said carrier, and means for adjusting the time of opening of said gate.

23. The combination of a rotating bolt-carrier adapted to receive bolts, a feeding-chute normally terminating at said carrier, a gate for retaining bolts in said chute and located between the latter and said carrier, devices for intermittently stopping said wheel and opening said gate, a single shaft connected up with the above-named elements for automatically operating the same, a second driving-shaft connected up with the first-named shaft, and means for changing the relative speed of the two shafts.

24. The combination of a bolt-carrier wheel having peripheral notches and its axis vertical, a feeding-chute in which are located bolts which are free to slide with their axes vertical by gravity alone entirely from said chute into said notches, a gate acting to stop said bolts, and projecting under said chute to act upon the shanks of said bolts, means for intermittently opening said gate, and devices for intermittently moving said carrier-wheel, the carrier being on a lower level than the delivery end of said feeding-chute, and said gate being so timed to act, that only one bolt is released at each opening and the parts being so proportioned and arranged that the gate in closing enters the space between the shanks of two bolts which are respectively on the carrier and in the chute.

25. The combination of a bolt-carrier wheel having peripheral notches, a feeding-chute in which are located bolts which are free to slide by gravity alone, entirely from said chute into said notches, a gate acting to stop said bolts, means for intermittently opening said gate, devices for intermittently moving said carrier-wheel, and a stop $54^D$ above said wheel so located and shaped as to maintain the heads of the bolts at predetermined angles relatively to said wheel, and said chute holding the heads at predetermined angles relatively to said stop.

26. The combination of a bolt-carrier wheel having peripheral notches, a feeding-chute in which are located bolts which are free to slide by gravity alone entirely from said chute into said notches, a gate acting to stop said bolts, means for intermittently opening said gate, devices for intermittently moving said carrier-wheel, a stop $54^D$ above said wheel so located and shaped as to maintain the heads of the bolts at predetermined angles relatively to said wheel, and said chute holding the heads at predetermined angles relatively to said stop, guides for said heads having a curved guiding-surface leading from the stop $54^D$ to near the position of a given discharge-chute, and then continuing as a rectilinear guide $54^B$ to said discharge-chute.

27. The combination with dies, of a bolt-carrier wheel having notches in its periphery, a feeding-chute terminating normally at one notch, a discharge-chute beginning normally near the next notch which is centrally over said dies, said notches receiving the shanks of said bolts, the heads of the bolts resting upon the wheel around the notches, a stationary curved guide for guiding the heads of the bolts and extending between the two notches, another guide for the heads extending from near the position of said second notch to said discharge-chute, the second guides being continuous with the first-named guides, said feeding-chute being adapted to contain bolts which are free to slide by gravity alone, entirely from said chute into said notches, a gate acting to stop said bolts, means for intermittently opening said gate, and devices for intermittently moving said carrier-wheel.

28. The combination with dies, of a bolt-carrier wheel having notches in its periphery, a feeding-chute terminating normally at one notch, a discharge-chute beginning normally near the next notch, which is centrally over said dies, said notches receiving the shanks of bolts, the heads of the bolts resting upon the wheel and around the notches, a curved guide stationary relatively to said wheel for guiding the head of the bolt and located between the two notches and extending beyond the second notch to said discharge-chute, said guide-piece having a hole centrally over the dies, a slide for supporting said carrier and said guide, a plunger-head attached to said slide and adapted to bear upon the head of a bolt which is located just below said hole, said feeding-chute being adapted to contain bolts which are free to slide by gravity alone, entirely from said chute successively into said notches, a gate acting to stop said bolts, means for intermittently opening said gate and devices for intermittently rotating said carrier-wheel.

29. The combination with dies, of a bolt-carrier having peripheral notches, said notches receiving the shanks of said bolts, the heads of the bolts resting upon the wheel around the notches, stops $54^B$ bearing loosely against the opposite sides of the head of a bolt to prevent the same from turning, a plunger pressing upon the top of the head of the bolt, and means for depressing said plunger and said carrier to the dies.

30. The combination with dies, of a bolt-carrier having peripheral notches for receiving the shanks of said bolts, the heads of the bolts resting upon the wheel around the notches, stops $54^B$ to prevent the bolts from turning and located at the sides of the heads thereof, a plunger pressing upon the top of the heads, a slide supporting said carrier, stops and plunger, and means for depressing said slide toward the dies.

31. The combination with dies, of an intermittently-rotating bolt-carrier having a series of notches adapted to receive the circular shank of a bolt, so that the head thereof rests by gravity alone, on said carrier, at the receiving position thereof, and stops acting on the squared or hexagonal head of the bolt only at the threading position, for resisting the rotating force of the dies, a plunger-head pressing on the bolt only at the threading position, and means for carrying and forcing said plunger with the bolt to the dies.

32. The combination with dies, of a bolt-carrier having a notch adapted to receive the shank of the bolt so that the head thereof rests by gravity on said carrier, means for resisting the rotating force of the dies upon said bolt, said means consisting of parallel stops $54^B$ at the sides of the head of said bolt, said stops following the bolt in its descent to said dies.

33. The combination with dies, of a bolt-carrier having a notch adapted to receive the shank of the bolt so that the head thereof rests by gravity on said carrier, and means for resisting the rotating forces of the dies, upon said bolt, a slide supporting said carrier, a barrel in which said slide reciprocates, and a discharge-chute secured to said barrel and having parallel guides which are a continuation of said stops.

34. The combination with dies, of a bolt-carrier wheel having notches in its periphery, a feeding-chute terminating normally at one notch, a discharge-chute beginning normally near the next notch, which is centrally over said dies, said notches receiving the shanks of said bolt, the heads of the bolt resting upon the wheel and around the notches, a curved guide-piece for guiding the head of the bolt located between the two notches and extending beyond the second notch to said discharge-chute, said guide-piece having a hole centrally over the dies, a slide for supporting said carrier, a plunger-head attached to said slide and adapted to bear upon the head of a bolt which is located just below said plunger, said feeding-chute being adapted to contain bolts which are free to slide by gravity alone, entirely from said chute successively into said notches, devices for intermittently moving said carrier-wheel, a gate consisting of a hook in front of the front bolt in said chute, a lever of which said hook forms an extension, a pivot for said lever secured upon said chute, a spring attached to said lever so that its free end bears against said chute for holding the gate normally closed, a pin and roller carried by said lever, an inclined plane bearing against said roller, a rod to which said inclined plane is attached, bearings extending from said chute and supporting said rod and permitting longitudinal movements thereof, said inclined plane being adjustable along said rod, and mechanism for reciprocating said rod at predetermined intervals.

35. The combination of a bolt-carrier adapted to receive bolts, a feeding-chute terminating at said carrier, a gate consisting of a hook in front of the front bolt of said chute, a lever of which said hook forms an extension, a pivot for said lever secured upon said chute, a retractile spring attached to said lever, for holding the gate normally closed, a pin and roller carried by said lever, an inclined plane bearing against said roller, a rod to which said inclined plane is attached, bearings for said rod and permitting only longitudinal movements thereof, said inclined plane being adjustable along said rod, and mechanism for reciprocating said rod at predetermined intervals for opening said gate.

36. The combination of a bolt-carrier wheel having peripheral notches, a feeding-chute in which are located bolts which are free to slide by gravity alone, entirely from said chute into said notches, devices for intermittently moving said wheel, a stop $54^D$ above said wheel so located and shaped as to maintain the heads of the bolts at predetermined angles with respect to said wheel, and said chute holding the heads at predetermined angles relatively to said stop, a gate consisting of a hook in front of the front bolt in said chute, a lever of which said hook forms an extension, a pivot for said lever, a retractile spring attached to said lever for holding said gate normally closed, a pin and roller carried by said lever, an inclined plane bearing against said roller, a rod to which said inclined plane is attached, bearings for said rod, permitting longitudinal movements thereof, said inclined plane being adjustable along said rod, and mechanism for reciprocating said rod at predetermined intervals for opening said gate.

37. The combination of a chute having a longitudinal groove on the under side thereof, adapted to hold the heads of bolts and inclined sufficiently for the bolts to slide down by gravity alone, a gate in front of the front bolt, and bearing against the shank of said bolt, the heads being within said groove, means for opening and closing the gate, a carrier opposite said gate and immediately adjacent thereto and having a notch for receiving the shank of one bolt at a time, a stop $54^D$ above said carrier against which the head of a bolt strikes, is stopped, and bears, and concentric guides above said carrier, one of said guides being a continuation of said stop.

38. In a bolt-machine, a bolt-chute, adapted to contain bolts which are free to slide by gravity from the chute, an angle-plate 98 serving as a lever, a gate in front of the bolts and fastened adjustably to said lever, whose pivot-pin is 101 located in the hole $98^C$ on top of the chute, a pin and roller carried by said lever, a retractile spring fastened to said lever for holding said gate closed, a rod movable longitudinally, an inclined plane carried by said rod and bearing against said roller, a slide on said rod and guides for said slide, a lug 108 on the slide and a constantly-rotating tripping-finger 20 in whose path said lug is located.

39. In a bolt-machine, a bolt-chute, adapted to contain bolts which are free to slide by gravity from the chute, an angle-plate 98 serving as a lever, a gate in front of the bolts and fastened adjustably to said lever, whose pivot-pin is 101 located in the hole 98$^C$ on top of the chute, a pin and roller carried by said lever, a spring fastened to said lever so that its free end presses against said chute for holding said gate closed, a rod movable longitudinally, an inclined plane carried by said rod and bearing against said roller, a slide on said rod and guides for said slide on said chute, a lug 108 on the slide and a constantly-rotating tripping-finger 20 in whose path said lug is located, said slide being adjustably fixed to said rod, a retractile spring 111$^A$ surrounding said rod and abutting against said slide, a constantly-rotating shaft for operating said tripping-finger 20 and a driver for turning said shaft.

40. In a bolt-machine, the combination of a bolt-feeding chute having a gate, means for opening said gate, a retractile spring for closing the same, a second retractile spring for returning said means to its normal position, and an intermittently-actuating element for operating said means to open said gate.

41. In a bolt-machine, the combination of a bolt-chute, a gate consisting of a pivoted hook provided with a pin and roller, and a reciprocating inclined plane acting on said roller for opening the gate at intervals.

42. In a bolt-machine, the combination of a bolt-chute, a gate consisting of a pivoted hook, a pin and roller provided therefor, a reciprocating rod, and an inclined plane carried by said rod and bearing on said roller.

43. The combination with dies, of a rotary bolt-carrier wheel having notches in its periphery, a feeding-chute terminating normally at one notch, a discharge-chute beginning normally near the next notch, which is centrally over the dies, said notches receiving the shanks of said bolt, the heads of the bolt resting upon the wheel and around the notches, a stationary curved guide-piece for guiding the head of the bolt and located between the two notches and extending beyond the second notch to said discharge-chute, said guide-piece having a hole centrally over the dies, a slide for supporting said carrier, a plunger attached to said slide, passing through said hole, and adapted to bear upon the head of the bolt which is located just below said hole, a pivoted gate for releasing bolts, and standing across the exit of said chute, means for opening said gate, a retractile spring for closing the same, and an intermittently-actuating element for operating said means to open said gate, and consisting of a constantly-rotating tripping-finger, and a lug in the path thereof connected up with said means.

44. In a bolt-machine, the combination of a declined chute in which the bolts have their axes substantially vertical, an openable gate for releasing bolts from said chute, a pivot on top of the chute for said gate to turn upon, a longitudinally-reciprocating rod connected up with said gate, a stop for limiting the motion of said rod, a slide attached to said rod and having bearings supported by said chute, means for returning said rod to its normal position, said chute being located on a higher level than that of said gate, which bears against the shank of the lowest bolt, while the heads of the bolts rest by gravity on the upper surface of said chute.

45. In a bolt-machine, the combination of a chute, an openable gate for releasing bolts from said chute, a longitudinally-reciprocating rod connected up with said gate, a stop for limiting the motion of said rod, a slide attached to said rod and having a bearing, a retractile spring for returning said rod to its normal position, a lug on said slide, and an intermittently-actuating finger in whose path said lug is located.

46. In a bolt-machine, a discharge-chute consisting of inclined tracks 155 and 156, a bracket 153 to which said tracks are bolted, a stationary support for said bracket, a rotating carrier-wheel having notches and having its upper periphery adjacent to and substantially in the same plane with the upper surfaces of said tracks, and parallel guides 54$^B$ on a guide-piece 54 which is above said wheel and movable therewith and whose surfaces are in line with the vertical edges of said tracks, and tracks 54$^A$ serving to guide the bolt-head, by the action of the rotation of said wheel, to a position between said tracks 54$^A$.

47. The combination of a bolt-feeding chute in which the bolts hang substantially vertical, the one behind the other, and which is inclined, a gate in front of the bolts at the exit of the chute, a notched bolt-carrier for receiving bolts from said chute, devices for turning said carrier to bring the bolt centrally over the dies of the bolt-machine, means for holding the bolt from turning on its axis when over said dies, a plunger bearing upon the head of said bolt, a reciprocating slide supporting said plunger and said carrier, mechanism controlled by said slide for opening said dies, a discharge-chute, guides for directing said bolt from the carrier to said discharge-chute, and a single driver connected up with all of the above-named elements for automatically operating the same.

48. The combination with constantly-rotating and intermittently-opening dies, of a slide 38, a bolt-carrier, supported thereby, a ratchet-wheel for said carrier, a pawl adapted to engage with said wheel, a slide 21 supporting said pawl, a cam 13, a lever connected with the slide 38 and having a pin and roller engaging with said cam, and a second cam 19, engaging with the slide 21.

49. The combination with constantly-rotating and intermittently-opening dies, of a slide 38, a bolt-carrier, a spindle therefor, a ratchet-wheel supported on said spindle, a pawl adapted to engage with said wheel, a slide 21 supporting said pawl, cams connected up respectively with said slides, and a constantly-rotating shaft for said cams.

50. The combination with constantly-rotating and intermittently-opening dies, of a slide 38, a bolt-carrier, a spindle therefor, a ratchet-wheel supported on said spindle, a pawl adapted to engage with said wheel, a slide 21 supporting said pawl, cams connected up respectively with said slides, a constantly-rotating shaft for said cams, and a catch governed by the motions of the slide 21 and 38 for intermittently locking said ratchet-wheel.

51. The combination of a bolt-carrier wheel having notches, a reciprocating slide, a spindle supporting said wheel and extending through the whole length thereof and projecting above the top thereof, a ratchet-wheel fixed on the upper end of said spindle and having as many teeth, consisting of pins on the top thereof, as there are notches in said bolt-carrier, said teeth projecting downward to form projections on the under side of said wheel, and adapted to be locked by a pivoted catch, which consists of a lever having a hole for receiving one of said pins, a spring constantly pressing said catch upward for locking said pin, a horizontally-reciprocating pawl extending at certain phases into the path of said catch, said pawl being adapted in its forward position to engage with one of said pins on said ratchet-wheel, a constantly-rotating shaft, a cam thereon, a slide 21 supporting said pawl, and a pin and roller supported on said slide and bearing on said cam.

52. The combination with constantly-rotating and intermittently-opening dies, of a slide 38, a bolt-carrier, a ratchet-wheel for said carrier, a pawl adapted to engage with said wheel, a slide 21 supporting said pawl, cams connected up respectively with said slides, a constantly-rotating shaft for said cams, a catch for said wheel governed by the motions of said slide for intermittently locking said wheel, an inclined bolt-feeding chute for supplying said carrier with bolts, and located on a higher level than said carrier, and directly opposite a notch provided in said carrier at its normal position, a gate for releasing said bolt and consisting solely of a hook standing across the exit of said chute for feeding said bolts from said chute to said carrier, a lever supporting said gate and having a pivot-pin, a pin and roller carried by said lever, a spring fastened to said lever to act as a retractile spring therefor for holding said gate closed, a rod movable longitudinally, an inclined plane carried by said rod and bearing against the roller upon said lever, a slide 107 for said rod, guides for said slide 107, a constantly-rotating tripping-finger on one of the above-named cams, and a lug on the slide 107 in the path of said finger.

53. The combination with constantly-rotating and intermittently-opening dies, of a reciprocating slide 38, a bolt-carrier governed longitudinally thereby, a slide 21 governing the rotary motions of said carrier, cams connected up respectively with said slides, a chute for supplying said carrier with bolts, a gate in addition to said slide 38 at the exit of said chute, and means for opening and closing said gate.

54. The combination with constantly-rotating and intermittingly-opening dies, of a reciprocating slide 38, a rotary bolt-carrier governed longitudinally thereby, a slide 21 governing the rotary motions of said carrier, cams connected up respectively with said slide, a chute for supplying said carrier with bolts, a gate for the exit of said chute, means for opening and closing said gate, and connected up with one of said cams, and a common shaft for both of said cams.

55. The combination with constantly-rotating and intermittently-opening dies, of a reciprocating slide 38, a bolt-carrier governed longitudinally thereby, a slide 21 governing the rotary motions of said carrier, cams connected up with said slides respectively, a chute for supplying said carrier with bolts, a gate for the exit of said chute, means for opening and closing said gate, and connected up with one of said cams, a common shaft for both of said cams, a connecting-rod between said dies and the slide 38, a shaft for rotating said dies, and intermediate driving mechanism between the said two shafts.

56. In a bolt-machine, the combination of a bolt-carrier, a slide having a bearing, a spindle for the carrier extending through said bearing, a ratchet-wheel consisting of a disk made rigid with said spindle, pins passing through the disk at equal intervals circularly, and projecting out, both from the upper surface and from the lower surface, the upper portions forming teeth 81, and the lower portions forming stumps $81^A$ which are adapted to be held and released by a catch, a pawl 69 in whose path the teeth 81 are located successively as often as the bolt rises out of the dies to its highest point, a pivoted lever or catch having a hole in the path of the stumps $81^A$, and pivoted to said slide, a spring continually pressing said catch upward toward said stump, an upwardly-formed hook $82^C$ in the path of said pawl, means for reciprocating said pawl, and a device for reciprocating said slide.

57. In a bolt-machine, a rotary bolt-carrier having a ratchet-wheel, a slide carrying a pawl for intermittently rotating said wheel, a pin and roller on said slide, guides consisting of slotted brackets, having notches $23^A$, covered by holding-plates 24, a cam with which said roller engages and consisting of a disk having tracks spaced to the diameter of said roller and having the first portion of its curvature an arc equal to about ninety degrees for maintaining said pawl directly over that tooth which is to be caught by it, a second portion of the curvature of said tracks for moving the slide back so as to turn said ratchet-wheel, the next curvature in order being an arc and serving to maintain said pawl in a free position away from said ratchet-wheel, and the fourth portion of the curve being a spiral gradually approaching said center, for moving the pawl again directly over said ratchet-wheel, and means for constantly rotating said cam.

58. In a bolt-machine, the combination of a bolt-carrier, a reciprocating slide supporting said carrier, a lever pivoted to the frame of said machine and pivotally connected to said slide, a constantly-rotating wheel, cams supported thereby and engaging with said lever alternately, for reciprocating the same, and a third cam rotating with the first-named cams, and a pawl and ratchet-wheel connected up with said carrier and with said third cam.

59. In a bolt-machine, the combination of a bolt-carrier, a reciprocating slide supporting said carrier, a lever pivoted to the frame of said machine and pivotally to said slide, a constantly-rotating wheel, cams supported thereby and engaging with said lever alternately, for reciprocating the same.

60. In a bolt-machine, a bolt-carrier, a yielding cam connected up with said carrier, a stop positively limiting the motion of the cam in one direction, a spring for limiting the motion in the other direction in a cushion-like manner, and a pivot-support for said cam.

61. In a bolt-machine, a reciprocating bolt-carrier, a yielding cam connected up with said carrier, for depressing the same, a stop positively limiting the motion of the cam in one direction, a spring for limiting the motion in the other direction in a cushion-like manner, a shaft and wheel carrying said cam, a second cam on said shaft adapted to engage by intermediate devices with said carrier, and a pivot-support for said cam.

62. In a bolt-machine, a bolt-carrier, a reciprocating slide supporting the same, a counterweight for the slide which has a central opening, tracks 80, a sliding block 77 on said tracks and movable back and forth and movable up and down with said slide, a lever pivotally connected to said block, and fulcrumed at the other end to the frame of the machine, a pin and roller on said lever, a cam 14 upon which said roller is adapted to bear, a pivot 14$^A$, a spring holding said cam away from the center of its rotation, a stop limiting the action of said spring, a wheel carrying said spring and said cam, means for adjusting said spring and consisting of an adjustable lever which supports said spring, said cam being movable toward the center of said wheel, and a cam 13$^C$ carried by said wheel in the path of said roller.

63. In a bolt-machine, a chute consisting of the combination of an inclined beam having a slot on the under side thereof, and having holes 112$^A$ located at intervals, plates 113 serving as tracks for the heads of the bolts and attached to said beam extending toward each other partly beyond the edges of the slot to form a groove in said beam, a spring-guide at one end of the chute, in said slot, opposite said tracks and attached at one end to said beam, and means for adjusting said guide.

64. In a bolt-machine, the combination of a reciprocating element, and means for reciprocating said element, consisting of a wheel, a cam pivoted eccentrically thereon, a spring resisting inward motions of said cam, a stop positively resisting outward movements of said spring, a second cam fixed permanently to said wheel and curving spirally from its periphery part way to the other cam, and means for adjusting the pressure of said spring against the first-mentioned cam.

65. In a bolt-machine, the combination of a reciprocating slide for taking the bolt to and from the dies of the machine, a rotary carrier supported thereon and supporting a ratchet-wheel by which said carrier is rotated, a longitudinally-reciprocating pawl for turning said wheel, and a catch pivoted to said slide, connected up with said wheel for locking the same, and governed, in its movements of locking and unlocking said wheel, by the joint action of said slide and said pawl.

66. In a bolt-machine, the combination of a hollow head for holding the dies and having a hollow spindle, a shaft connected up therewith for rotating the head, a rotary and longitudinally-reciprocating bolt-carrier, a shaft connected up therewith through the medium of cams and levers, for operating the same, means for communicating motion from the first shaft to the second, change-gear and cone-pulleys forming the essential elements of said means.

67. The combination of a rotating head, a bolt-carrier a moving device for manipulating the bolt-carrier with respect to said head and intermediate mechanism between said head and said device for changing the speed of said device relatively to the speed of said head, said mechanism consisting essentially of change-gear wheels, in combination with belted cone-wheels, and of cams which act jointly upon said carrier, respectively imparting thereto an intermittent rotary motion and a reciprocating longitudinal motion.

68. The combination with dies, of a bolt-carrier wheel for bringing the bolt centrally over the dies, and having notches in its periphery, a feeding-chute terminating normally at one notch, a discharge-chute terminating normally at the next notch, the notches being only large enough to receive the shanks of the bolts, the heads resting on top of the wheel around the notches, means for rotating said wheel for carrying a bolt from the feeding-chute to the discharge-chute, and a guide-piece just above said wheel and having a groove for the bolt-heads extending between the two notches and shaped concentrically around the center of said wheel, the groove then becoming straight, instead of curved, from the position of said second notch to said discharge-chute.

In testimony whereof we have hereunto subscribed our names this 23d day of July, 1901.

FLAVIUS P. STIKER. [L. S.]
ORVILLE C. BURTON. [L. S.]

Witnesses:
L. C. WEAD,
M. F. SHARP.